US008880804B2

(12) United States Patent
Iida

(10) Patent No.: US 8,880,804 B2
(45) Date of Patent: Nov. 4, 2014

(54) STORAGE APPARATUS AND DATA MANAGEMENT METHOD

(75) Inventor: Nobuhiro Iida, Odawara (JP)

(73) Assignee: Hitachi, Ltd., Tokyo (JP)

(*) Notice: Subject to any disclaimer, the term of this patent is extended or adjusted under 35 U.S.C. 154(b) by 212 days.

(21) Appl. No.: 13/499,906

(22) PCT Filed: Mar. 21, 2012

(86) PCT No.: PCT/JP2012/001957
§ 371 (c)(1),
(2), (4) Date: Apr. 2, 2012

(87) PCT Pub. No.: WO2013/140447
PCT Pub. Date: Sep. 26, 2013

(65) Prior Publication Data
US 2013/0254483 A1 Sep. 26, 2013

(51) Int. Cl.
G06F 12/08 (2006.01)
(52) U.S. Cl.
USPC ............... 711/117; 710/5; 710/22; 711/156; 711/162; 711/170
(58) Field of Classification Search
CPC ...... G06F 3/0689; G06F 12/08; G06F 12/023
USPC ........ 710/5, 22; 711/156, 162, E12.001, 117, 711/170
See application file for complete search history.

(56) References Cited

U.S. PATENT DOCUMENTS

| 8,069,326 | B2* | 11/2011 | Shimizu et al. | ............... 711/165 |
| 2008/0104350 | A1* | 5/2008 | Shimizu et al. | ............... 711/165 |
| 2010/0115222 | A1 | 5/2010 | Usami | |
| 2011/0167236 | A1 | 7/2011 | Orikasa et al. | |
| 2011/0197046 | A1* | 8/2011 | Chiu et al. | ..................... 711/171 |
| 2011/0289287 | A1* | 11/2011 | Yamamoto et al. | ........... 711/156 |
| 2012/0011329 | A1 | 1/2012 | Nonaka | |
| 2013/0290281 | A1* | 10/2013 | Yokoi et al. | ................... 707/693 |

OTHER PUBLICATIONS

PCT International Search Report and Written Opinion on application PCT/JP2012/001957 mailed Aug. 17, 2012; 9 pages.

* cited by examiner

Primary Examiner — Reginald Bragdon
Assistant Examiner — Mehdi Namazi
(74) Attorney, Agent, or Firm — Foley & Lardner LLP

(57) ABSTRACT

A storage apparatus includes storage devices of a plurality of types of varying performance, and a control unit which manages each of storage areas provided by the storage devices of the plurality of types by means of storage tiers of a plurality of different types, and assigns the storage areas in page units to a virtual volume from any of the storage tiers among the storage tiers of the plurality of types. If the data I/O request is received from the host, the control unit assigns storage areas in page units from the uppermost storage tier to the target areas of the virtual volume corresponding to the I/O request The control unit changes the page unit storage area assignment to predetermined areas of the virtual volume from an upper storage tier to a lower storage tier in accordance with the speed of processing of the data I/O request.

10 Claims, 26 Drawing Sheets

FIG. 8

POOL SCHEDULE MANAGEMENT TABLE

| POOL NO | Tier No | LIMIT MARGIN [%] | SAFETY FACTOR [%] | TOTAL CAPACITY [TB] | FREE CAPACITY [TB] | USED CAPACITY [TB] | GUIDE MARGIN CAPACITY [TB] | HOST I/F PERFORMANCE [MB/s] | DEMOTION PERFORMANCE [MB/s] | TIER DEPLETION TIME [YYYY/MM/DD, hh:mm] | GUIDE MARGIN SECURING TIME [h] | DEMOTION START TIME [YYYY/MM/DD, hh:mm] |
|---|---|---|---|---|---|---|---|---|---|---|---|---|
| 0 | 1 | 20 | 10 | 5 | 4 | 1 | 1.5 | 100 | 50 | 2012/1/1, 11:07 | 8.33 | 2012/1/1, 2:47 |
| 0 | 2 | — | 10 | 50 | 40 | 10 | 5 |  | 40 | 2012/1/1 0, 6:15 | 34.72 | 2012/1/9, 5:32 |
| 0 | 3 | — | 10 | 100 | 100 | 0 | 10 |  | — | 2012/1/dd, hh:mm | ZZ.ZZ | 2012/1/dd, hh:mm |
| 1 | 1 | 20 | 10 | 5 | 4 | 1 | 1.5 | 100 | 50 | 2012/1/1, 11:07 | 8.33 | 2012/1/1, 2:47 |
| 1 | 2 | — | 10 | 50 | 40 | 10 | 5 |  | 40 | 2012/1/1 0, 6:15 | 34.72 | 2012/1/9, 5:32 |
| 1 | 3 | — | 10 | 100 | 100 | 0 | 10 |  | — | 2012/1/dd, hh:mm | ZZ.ZZ | 2012/1/dd, hh:mm |
| 2 | 1 | 20 | 10 | 5 | 4 | 1 | 1.5 | 100 | 50 | 2012/1/1, 11:07 | 8.33 | 2012/1/1, 2:47 |
| 2 | 2 | — | 10 | 50 | 40 | 10 | 5 |  | 40 | 2012/1/1 0, 6:15 | 34.72 | 2012/1/9, 5:32 |
| 2 | 3 | — | 10 | 100 | 100 | 0 | 10 |  | — | 2012/1/dd, hh:mm | ZZ.ZZ | 2012/1/dd, hh:mm |
| 3111 | 3112 | 3113 | 3114 | 3115 | 3116 | 3117 | 3118 | 3119 | 3120 | 3121 | 3122 | 3123 |

Create DT Pool

DT Pool Property

Enter the information for the DT pool to be created.

| Basic | Advanced |

*DT Pool: [001] — 501
From 0 to max (array model type dependent)

RAID Level: [RAID6 ▼] — 503

Combination: [8D+2P ▼] — 504

*Number of drives: [10] — 505
From 2 to max(based on drive count)

*1st Tier margin rate : [10] — 502
From 10 to max 50 [%]

Drives:

● Automatic Selection :

Drive Type : [SAS ▼]
Drive Capacity : [146GB ▼] — 506

○ Manual Selection :

Assignable Drives — 507

Rows/Page: [25 ▼]  |< << Page [1] of 1 >> >|

| | Tray | HDU | Drive Type | Status |
|---|---|---|---|---|
| ☐ | 00 | 00 | SAS (500GB) | Mounted |
| ☐ | 00 | 01 | SAS (500GB) | Mounted |
| ☐ | 00 | 07 | SAS (500GB) | Mounted |

[Filter] [Filter Off]

[Help]  [OK] [Cancel]

* Required field

FIG.10

PAGE DISPOSITION DESTINATION MANAGEMENT TABLE

| RG No | PAGE NO | COUN-TER | LAST ACCESS DATE AND TIME | POOL NO | LU No | LBA | CURRENT TIER | TARGET TIER |
|---|---|---|---|---|---|---|---|---|
| 0 | 0 | 250 | 2012/1/1, 22:50:00.00 | 0 | 0 | YYYYYY | 1 | 1 |
|  | 1 | 100 | 2012/1/12, 22:30:00.00 | 0 | 3 | YYYYYY | 3 | 1 |
|  | 2 | 20 | 2012/1/XX, hh:mm:ss.ss | 0 | 3 | YYYYYY | 1 | 2 |
|  | 3 | 330 | 2012/1/XX, hh:mm:ss.ss | 0 | 3 | YYYYYY | 1 | 1 |
|  | 4 | 500 | 2012/1/XX, hh:mm:ss.ss | 0 | 3 | YYYYYY | 1 | 1 |
|  | 5 | 10 | 2012/1/XX, hh:mm:ss.ss | 0 | 2 | YYYYYY | 1 | 2 |
|  | 6 | 5 | 2012/1/XX, hh:mm:ss.ss | 0 | 2 | YYYYYY | 2 | 3 |
|  | 7 | 2 | 2012/1/XX, hh:mm:ss.ss | 0 | 2 | YYYYYY | 3 | 3 |
|  | ... | ... | ... | 0 | ... | ... | ... | ... |
|  | XXXX | XXXX | XXXX | 0 | XXXX | XXXX | XXXX | XXXX |
| 1 | 0 | 250 | 2012/1/1, 22:50:00.00 | 0 | 4 | ZZZZZZ | 1 | 1 |
|  | 1 | 100 | 2012/1/12, 22:30:00.00 | 0 | 5 | ZZZZZZ | 3 | 1 |
|  | 2 | 20 | 2012/1/XX, hh:mm:ss.ss | 0 | 4 | ZZZZZZ | 1 | 2 |
|  | 3 | 330 | 2012/1/XX, hh:mm:ss.ss | 0 | 4 | ZZZZZZ | 1 | 1 |
|  | 4 | 500 | 2012/1/XX, hh:mm:ss.ss | 0 | 6 | ZZZZZZ | 1 | 1 |
|  | 5 | 10 | 2012/1/XX, hh:mm:ss.ss | 0 | 7 | ZZZZZZ | 1 | 2 |
|  | 6 | 5 | 2012/1/XX, hh:mm:ss.ss | 0 | 7 | ZZZZZZ | 2 | 3 |
|  | 7 | 1 | 2012/1/XX, hh:mm:ss.ss | 0 | 7 | ZZZZZZ | NULL | 1 |
|  | ... | ... | ... | 0 | ... | ... | ... | ... |
|  | XXXX | XXXX | XXXX | 0 | XXXX | XXXX | XXXX | XXXX |
| 2 |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
| ... | ... | ... | ... | ... | ... | ... | ... | ... |
| XXXX | XXXX | XXXX | XXXX | XXXX | XXXX | XXXX | XXXX | XXXX |

PROMOTION EXECUTION
RESERVE QUEUE

| RG No | PAGE NO |
|-------|---------|
| 3 | 55 |
| 3 | 56 |
| 3 | 57 |
| 1 | 8 |
| 2 | 0 |
| 2 | 1 |

TIER 1 TO TIER 2 DEMOTION
EXECUTION RESERVE QUEUE

| RG No | PAGE NO |
|-------|---------|
| 2 | 100 |
| 2 | 101 |
| 2 | 102 |
| 2 | 103 |
| 2 | 104 |
| 2 | 105 |
| 2 | 106 |
| 2 | 107 |
| 2 | 108 |
| 1 | 10 |
| 1 | 11 |
| 1 | 12 |
| 1 | 13 |
| 1 | 14 |
| 1 | 15 |

314A 3141  3142

TIER 2 TO TIER 3 DEMOTION EXECUTION RESERVE QUEUE

DATA WRITE PROCESSING

READ PROCESSING (CACHE MISS)

STORAGE APPARATUS AND DATA MANAGEMENT METHOD

TECHNICAL FIELD

The present invention relates to a storage apparatus and data management method and is suitably applied to a storage apparatus in which a hierarchical data management function is installed, for example.

BACKGROUND ART

In recent years, one such function which is installed in a storage apparatus that has been attracting attention is a virtualization function known as thin provisioning. A thin provisioning function is a function which provides a host with a virtual logical volume (referred to hereinbelow as a virtual volume), and which, when a request to write data to the virtual volume is supplied from the host, dynamically assigns a storage area to the virtual volume. The thin provisioning function is advantageous in providing to the host a virtual volume with a larger capacity than the storage area that is actually available and in affording the construction of a low-cost computer system by reducing the physical storage capacity in the storage apparatus which is to be pre-prepared.

Furthermore, as a data management method for this kind of storage apparatus in which the thin provisioning function is installed, a hierarchical data management method has conventionally been proposed (PTL 1, for example). A hierarchical data management method is a method in which storage areas provided by each of a plurality of types of storage devices of varying performance which are built into the storage apparatus are managed as storage tiers of a plurality of different types, where storage areas are assigned from a high-speed, high-performance storage tier to areas where data of high access frequency in the virtual volume is stored, and storage areas are assigned from a low-speed, low-performance storage tier to areas where data of low access frequency in the virtual volume is stored. With this hierarchical data management method, the cost performance of the storage apparatus can be improved.

CITATION LIST

Patent Literature

PTL 1: U.S. Published Unexamined Application No. 2011/0167236

SUMMARY OF INVENTION

Technical Problem

However, with the foregoing hierarchical data management method, there is a problem in that, because the assignment destination of storage areas (pages) is determined according to the access frequency, even though a page which has been accessed once will likely be accessed once again for a short time and even though there may be a sudden increase in access to a page which has been assigned to a lower tier, it takes time for the page to be assigned to an upper tier and a response speed which matches the access frequency cannot be obtained.

The present invention was conceived in view of the above points and proposes a storage apparatus and data management method enabling optimal page disposition in response to a sudden increase in the access frequency to a specific page.

Solution to Problem

In order to solve this problem, the present invention provides a storage apparatus which is coupled to a host which issues a data I/O request via a network, comprising storage devices of a plurality of types of varying performance, and a control unit which manages each of storage areas provided by the storage devices of the plurality of types by means of storage tiers of a plurality of different types, and assigns the storage areas in page units to a virtual volume from any of the storage tiers among the storage tiers of the plurality of types in response to a request to write the data from the host, wherein, if the data I/O request is received from the host, the control unit assigns storage areas in page units from the uppermost storage tier to the target areas of the virtual volume corresponding to the I/O request, and wherein the control unit changes the page unit storage area assignment to predetermined areas of the virtual volume from an upper storage tier to a lower storage tier in accordance with the speed of processing of the data I/O request from the host.

With this configuration, pages accessed by the host are disposed in the uppermost storage tier and pages in the uppermost storage tier are migrated according to the speed of processing the I/O request from the host. As a result, the optimal command response time to access by the host can be expected and optimal page disposition can be executed according to the speed of I/O processing by the host.

Advantageous Effects of Invention

The present invention makes it possible to provide optimal page disposition in response to a sudden increase in the access frequency to a specific page.

BRIEF DESCRIPTION OF DRAWINGS

FIG. 8 is a table showing content of a pool schedule management table according to this embodiment.

FIG. 9 is a conceptual view of an example of a pool schedule input screen according to this embodiment.

FIG. 10 is a table showing content of a page disposition destination management table according to this embodiment.

FIG. 11 is a table showing content of a promotion execution reservation queue according to this embodiment.

FIG. 12 is a table showing content of a demotion execution reservation queue according to this embodiment.

DESCRIPTION OF EMBODIMENTS

An embodiment of the present invention will be described in detail hereinbelow with reference to the drawings.

Figure 1:
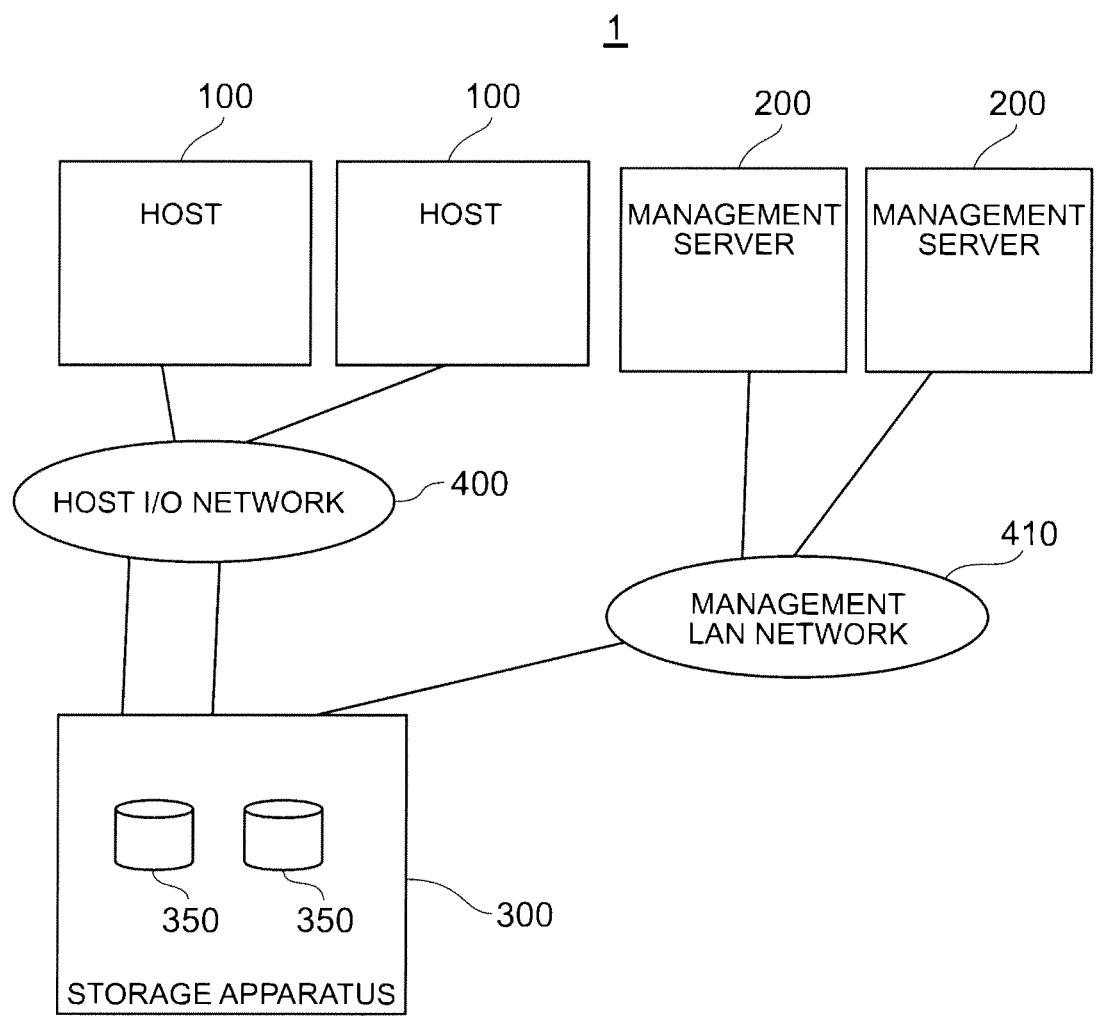
FIG. 1 is a block diagram showing a hardware configuration of a storage system according to a first embodiment of the present invention.

(1) Configuration of Computer System (1-1) Hardware Configuration of Computer System First, a hardware configuration of a computer system 1 according to this embodiment will be described. As shown in FIG. 1, the computer system 1 is configured from hosts 100, management servers 200, and a storage apparatus 300.

The hosts 100 are computer device which comprise information processing resources such as a CPU (Central Processing Unit) and memory and the like and are configured, for example, from a personal computer, a workstation, or a mainframe. In order to reference or update data which is stored in the storage apparatus 300, the hosts 100 transmit read requests or write requests to the storage apparatus 300 via a network. Furthermore, the hosts 100 are coupled to the storage apparatus 300 via a host I/O network 400. The host I/O network 400 is configured from a SAN (Storage Area Network) or the like, for example, and communications between apparatuses are performed according to the fibre channel protocol, for example.

The host I/O network 400 may be a LAN (Local Area Network), the Internet, a public line or a lease line or the like, for example. If the host I/O network 400 is a LAN, communications between apparatuses are carried out according to the TCP/IP (Transmission Control Protocol/Internet Protocol) protocol, for example.

The management servers 200 are computer devices comprising information processing resources such as a CPU and memory and are configured, for example, from a personal computer, a workstation, or a mainframe or the like. The management servers 200 are coupled to the storage apparatus 300 via a management LAN network 410. The management LAN network 410 is configured from a SAN or LAN or the like, for example.

Furthermore, a program stored in the memory of the management servers 200 manages the storage media of the storage apparatus 300 and manages, for example, the configuration of RAID (Redundant Arrays of Inexpensive Disks) groups and the capacities of logical volumes which are configured from part of the RAID groups. The management servers 200 transmit commands corresponding to user operations and the like to the storage apparatus 300 and changes RAID configuration information or the like.

The storage apparatus 300 is coupled to the host 100 via the host I/O network 400 and executes reading/writing from and to the storage media in the storage apparatus by parsing the commands from the hosts 100. Furthermore, the storage apparatus 300 is coupled to the management servers 200 via the management LAN network 410 and changes the RAID configuration in response to instructions from the management servers 200.

(1-2) Hardware Configuration of Host

Figure 2:
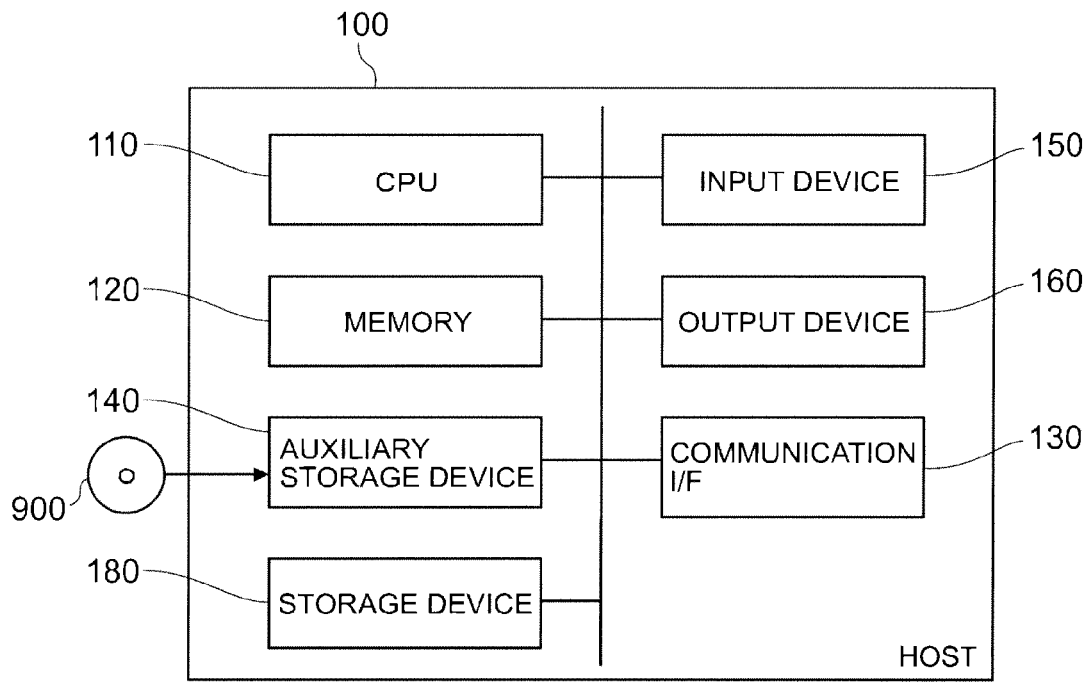
FIG. 2 is a block diagram showing a hardware configuration of a host according to this embodiment.

As shown in FIG. 2, the host 100 comprises a CPU 110, a memory 120, a communication interface (communication I/F in the drawings) 130, an auxiliary storage device 140, an I/O device 150, an output device 160, and a storage device 180.

The CPU 110 functions as an arithmetic processing device and a controller and controls the general operation in the host 100 according to various programs. The memory 120 stores programs and arithmetic parameters and the like which are used by the CPU 110, and primarily stores programs which are used in the execution of the CPU 110 as well as parameters and so on which are suitably changed in this execution.

The communication interface 130 is a communication interface which is configured from a communication device or the like for connecting to the host I/O network 400. Further, the communication interface 130 may be a wired communication device which performs communications over wires irrespective of whether the communication device 130 is a wireless LAN (Local Area Network)-compatible communication device or a wireless USB-compatible communication device.

The auxiliary storage device 140 is a removable storage medium such as a magnetic disk, an optical disk, a magneto-optical disk, or a semiconductor memory. The input device 150 is configured from input means enabling the user to input information such as, for example, a mouse, a keyboard, a touch panel, a button, a microphone, a switch, and a lever and an input control circuit which generates an input signal based on the input by the user and outputs the input signal to the CPU 110. The output device 160 is configured, for example, from a display device such as a CRT (Cathode Ray Tube) display device, a liquid-crystal display (LCD) device, an OLED (Organic Light Emitting Display) device or a lamp and from an audio output device such as speakers or headphones.

The storage device 180 comprises a storage medium, a recording device for recording data to the storage medium, a reading device for reading data from the storage medium, and a deletion device for deleting data recorded to the storage medium, and the like, and is configured from a HDD (Hard Disk Drive), for example.

(1-3) Hardware Configuration of Management Server

Figure 3:
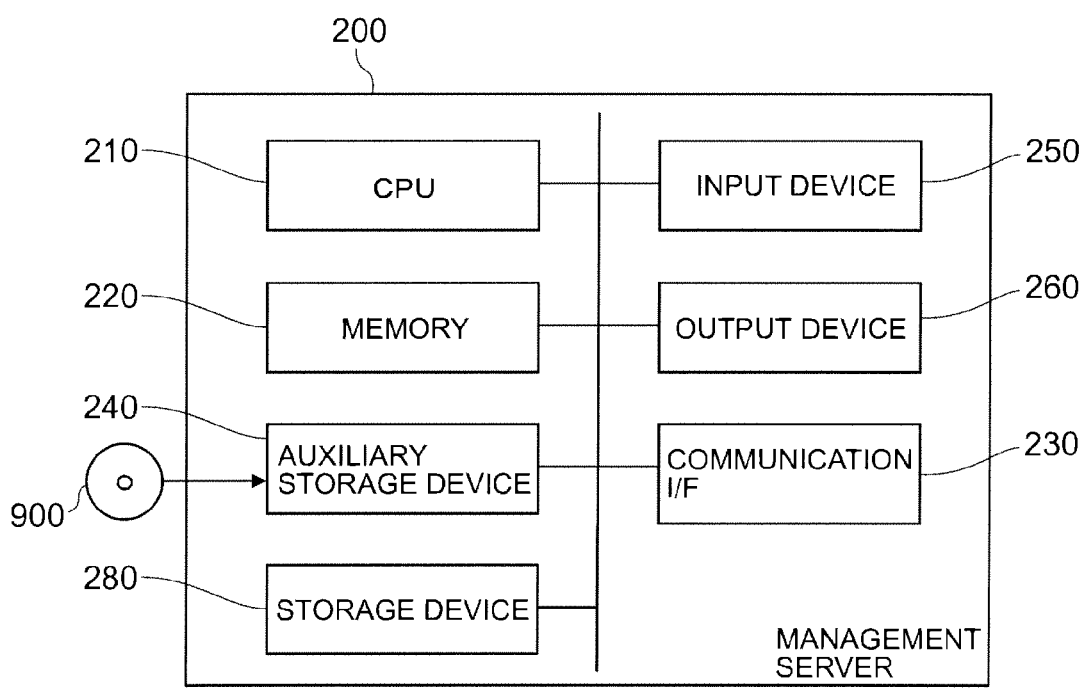
FIG. 3 is a block diagram showing a hardware configuration of a management server according to this embodiment.

As shown in FIG. 3, the management server 200 comprises a CPU 210, a memory 220, a communication interface (communication I/F in the drawings) 230, an auxiliary storage device 240, an I/O device 250, an output device 260, and a storage device 280.

The CPU 210 functions as an arithmetic processing device and a controller and controls the general operation in the management server 200 according to various programs. The memory 220 stores programs and arithmetic parameters and the like which are used by the CPU 210, and primarily stores programs which are used in the execution of the CPU 210 as well as parameters and so on which are suitably changed in this execution.

The communication interface 230 is a communication interface which is configured from a communication device or the like for connecting to the host I/O network 400. Further, the communication interface 230 is a wired communication device which performs communications over wires irrespective of whether the communication device is a wireless LAN (Local Area Network)-compatible communication device or a wireless USB-compatible communication device.

The auxiliary storage device 240 is a removable storage medium such as a magnetic disk, optical disk, magneto-optical disk, or a semiconductor memory. The input device 250 is configured from input means enabling the user to input information such as, for example, a mouse, a keyboard, a touch panel, a button, a microphone, a switch, and a lever and an input control circuit which generates an input signal based on the input by the user and which outputs the input signal to the CPU 210. The output device 260 is configured, for example, from a display device such as a CRT (Cathode Ray Tube) display device, a liquid-crystal display (LCD) device, an OLED (Organic Light Emitting Display) device or a lamp and from an audio output device such as a speaker or headphone.

The storage device 280 comprises a storage medium, a recording device for recording data to the storage medium, a reading device for reading data from the storage medium, and a deletion device for deleting data recorded to the storage medium, and the like, and is configured from a HDD (Hard Disk Drive), for example.

(1-4) Hardware Configuration of Storage Apparatus

Figure 4:
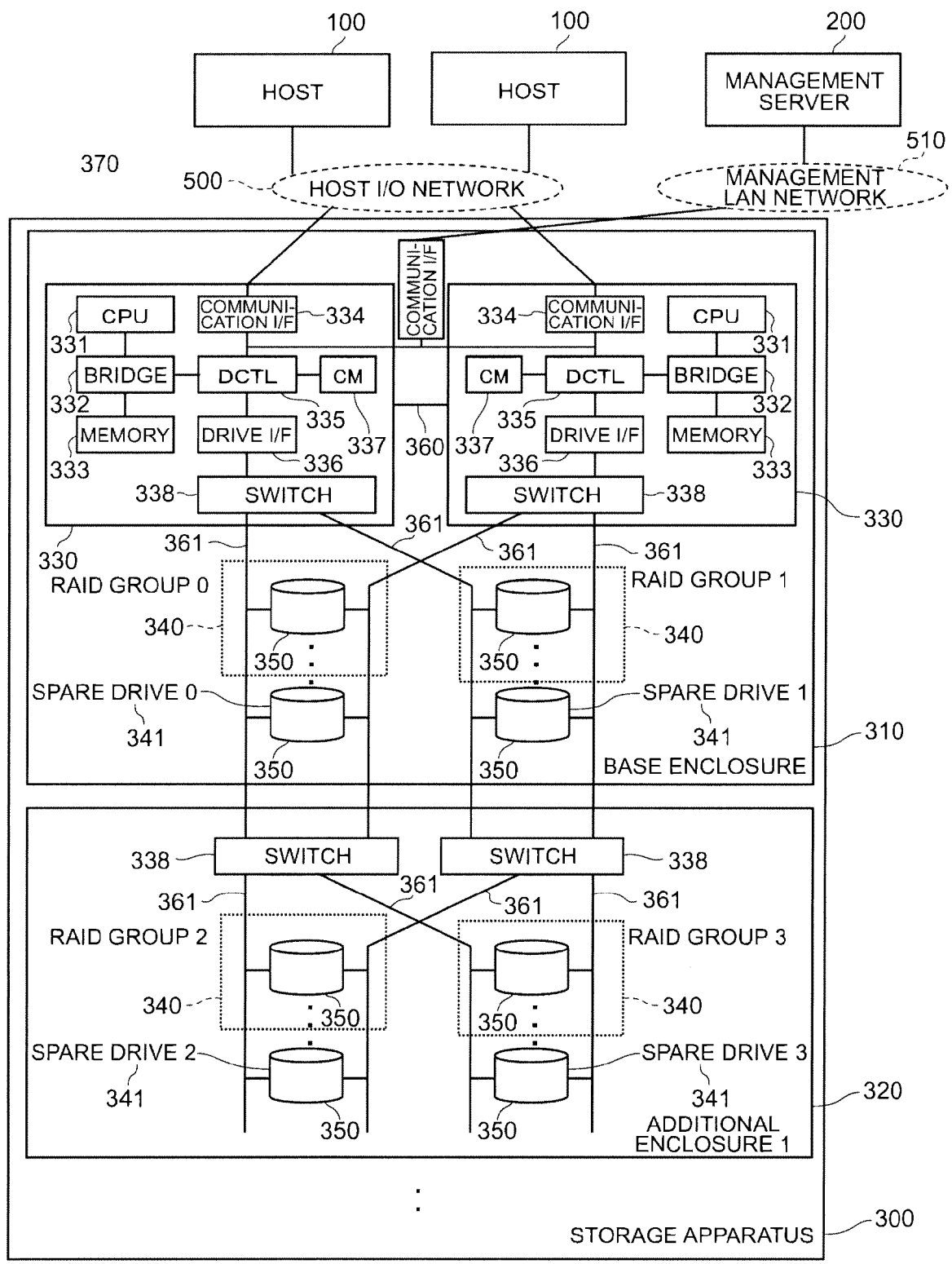
FIG. 4 is a block diagram showing a hardware configuration of a storage apparatus according to this embodiment.

As shown in FIG. 4, the storage apparatus 300 is configured from a base enclosure 310 and a plurality of additional enclosures 320.

The storage apparatus 300 is configured by serially connecting the base enclosure 310 to the plurality of additional enclosures 320. The base enclosure 310 is configured comprising a plurality of disk controllers 330 and a plurality of hard disk drives 350.

The disk controllers 330 each comprise a CPU 331, a bridge 332, a memory 333, a communication interface (communication I/F in the drawings) 334, a data controller (DCTL in the drawings) 335, a drive interface (drive I/F in the drawings) 336, a cache memory (CM in the drawings) 337, and a switch 338.

The CPU 331 responds to data I/O requests from the hosts 100 and controls I/O processing (write access or read access) to/from the plurality of hard disk drives 350. The bridge 332 interconnects the CPU 331, the memory 333, and the data controller 335. In addition to storing various programs of the CPU 331, the memory 333 functions as a work area of the CPU 331. The communication interface (communication I/F in the drawings) 334 is a controller for controlling the interface with the hosts 100 and comprises a function for receiving block access requests from the host system 50 using the fibre channel protocol, for example.

The data controller (DCTL in the drawings) 335 interconnects the bridge 332 and the cache memory 337 and controls data transfers between the hosts 100 and the hard disk drive 350. More specifically, when write access from the hosts 100 is executed, the data controller 335 writes write data received from the hosts 100 (dirty data) to the cache memory 337. Thereafter, at the stage where the write data in the cache memory 337 has accumulated to a certain extent, the data controller 335 asynchronously writes the write data to the hard disk drives 350. If, on the other hand, read access from the hosts 100 is executed, the data controller 335 writes read data which is read from the hard disk drive 350 to the cache memory 337 and transfers the data to the hosts 100.

The drive interface (drive I/F in the drawings) 336 performs protocol conversion between the fibre channel protocol and the SATA protocol. The drive interface 336 is coupled to the switch 338. The switch 338 connects the hard disk drive 350 to the drive interface 336.

Further, the controller 330 is able to control a plurality of hard disk drives 350 according to the RAID level (0, 1, 5, for example) prescribed by the so-called RAID system. In a RAID system, a plurality of hard disk drives 350 are managed as a single RAID group 340. A plurality of logical volumes which are units of access from the hosts 100 are defined in the RAID groups 340. The LUN (Logical Unit Number) is assigned to each of the logical volumes.

Furthermore, the storage apparatus 300 is able to expand the storage capacity by additionally providing additional enclosures 320 to the base enclosure 310.

The additional enclosure 320 is coupled to the controller 330 of the base enclosure 310 via the switch 338. Like the base enclosure 310, the controller 310 is capable of controlling the plurality of hard disk drives 350 according to the RAID level (0, 1, 5, for example) which is prescribed by the so-called RAID system.

(1-5) Logical Configuration of Storage Apparatus

Figure 5:
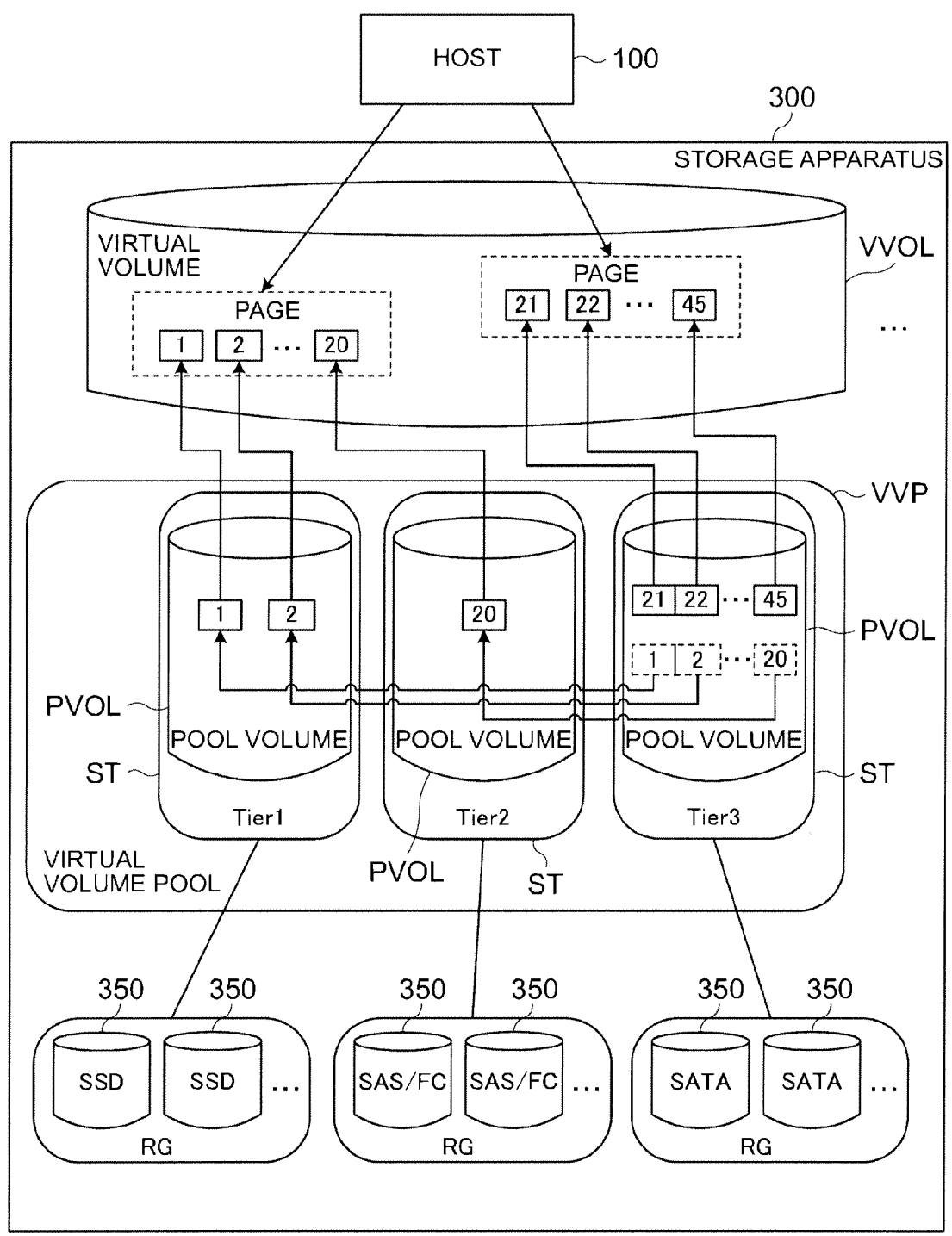
FIG. 5 is a block diagram showing a logical configuration of the storage apparatus according to this embodiment.

FIG. 5 shows the logical configuration of the storage apparatus 300. As is also clear from FIG. 5, in the storage apparatus 300, RAID groups RG are defined by one or more storage devices 350 (hard disk drives 350 in FIG. 4) of the same type (SSD, SAS/FC and SATA and the like), and one or more pool volumes PVOL are defined in storage areas provided by one or more storage devices 350 which constitute a single RAID group. The pool volumes PVOL defined in the storage areas provided by the storage devices 350 of the same type are each managed as storage tiers ST of the same type and the plurality of pool volumes PVOL belonging to mutually different storage tiers ST are managed as a single virtual volume pool VVP.

In the case of this embodiment, storage devices 30 of four types of SSD, SAS disks, FC disks, and SATA disks are used as the storage devices 350 as mentioned earlier, and a pool volume PVOL defined in the storage area provided by one or more SSDs is managed as a storage tier called Tier 1 (hereinafter called the first storage tier) ST, a pool volume PVOL defined in the storage area provided by one or more SAS disks or FC disks is managed as a storage tier called Tier 2 (hereinafter called the second storage tier) ST, and a pool volume PVOL defined in the storage area provided by one or more SATA disks is managed as a storage tier called Tier 3 (hereinafter called the third storage tier) ST.

Note that, among these types of storage devices 350 (SSD, SAS/FC and SATA), the storage device type which is the most reliable and exhibits the highest response performance is SSD, the storage device type which is the next most reliable and exhibits the next highest response performance is the SAS disk or FC disk, and the storage device type which is the least reliable and exhibits the lowest response performance is the SATA disk. Accordingly, in the case of this embodiment, among the first to third storage tiers ST which constitute the virtual volume pool VVP, the storage tier which is the most reliable and exhibits the highest response performance is the first storage tier ST, the storage tier with the next most reliable and exhibits the next highest response performance is the second storage tier ST, and the storage device type which is the least reliable and exhibits the lowest response performance is the third storage tier ST.

Meanwhile, one or more virtual volumes VVOL are defined in the storage apparatus 300. The virtual volumes VVOL are each assigned a unique identifier (hereinafter called LUN (Logical Unit Number)). Furthermore, areas in the virtual volume VVOL are divided into blocks of a predetermined size (hereinafter called logical blocks) and are managed using unique numbers (hereinafter called LBA (Logical Block Address)) which are each assigned to the logical blocks. Data I/O requests (write requests and read requests) to the virtual volumes VVOL from the hosts 100 are made by designating the LUN of the virtual volumes from/to which data is read and written, and the LBA and the data lengths of the leading logical blocks of the areas from/to which data in the virtual volumes VVOL is read and written.

Any one of the virtual volume pools VVP is pre-associated with each of the virtual volumes VVOL. Further, upon receiving a request to write data to the virtual volumes VVOL from the hosts 100, the storage apparatus 300 assigns storage areas of the required amount in units of a predetermined size called pages from the virtual volume pool VVP associated with the virtual volume VVOL to the area designated in the write request in the virtual volume VVOL designated in the write request and writes write target data to the assigned pages.

Here, pages are base units of the storage areas assigned to the virtual volumes VVOL from any of the storage tiers (the first to third storage tiers) ST which constitute the virtual volume pools VVP associated with the virtual volumes VVOL. In the following description, one page and one logical block of a virtual volume VVOL are described as storage areas of the same storage size but are not necessarily limited to being storage areas of the same storage size.

Furthermore, when pages are assigned from the virtual volume pool VVP which corresponds to the virtual volume VVOL, the storage apparatus 300 sequentially assigns pages, among assignable pool volumes PVOL, from the pool volume PVOL which belongs to the storage tier ST which is the most reliable and has the highest response performance. Hence, the storage apparatus 5A assigns pages to the virtual volume VVOL from the pool volume PVOL until pages not yet assigned to the pool volume PVOL are depleted in the following order: the pool volume PVOL which belongs to the first storage tier ST, the pool volume PVOL which belongs to the second storage tier ST and the pool volume PVOL which belongs to the third storage tier ST.

Meanwhile, the storage apparatus 300 monitors the frequency of access by the hosts 100 per unit time to each of the logical blocks of the virtual volumes VVOL in parallel with processing to assign pages to the virtual volume VVOL mentioned earlier.

Further, the storage apparatus 300 migrates data according to requirements between the first to third storage tiers ST so that pages are assigned from the first or second storage tiers ST which are the next most reliable and which have the next highest response performance to logical blocks which have a high access frequency and so that pages are assigned from the second or third storage tier ST which is less reliable and which have a lower response performance to logical blocks which have a low access frequency at regular or irregular intervals on the basis of the access frequency per unit time.

(1-6) Overview of Data Management Method According to this Embodiment

An overview of the data management method in the storage apparatus 300 will be described next. As mentioned earlier, the storage apparatus 300 has a built-in hier-archical data management function, and storage area is assigned from high-speed and high-performance storage tiers to areas in the virtual volume which store data with a high access frequency and storage area is assigned from low-speed and low-performance storage tiers to areas in the virtual volume which store data with a low access frequency. With this hierarchical data management method, the cost performance of the storage apparatus 300 can be improved.

However, according to the hierarchical data management method above, because the tier to which the storage area is assigned is determined by the access frequency of each page, it takes a period of a few hours or more until pages which have been accessed once are distributed to a suitable tier. Therefore, a page which is to be accessed quickly is disposed on the uppermost tier, and there is a problem in that it takes time until an optimal command response time can be expected.

Figure 6:
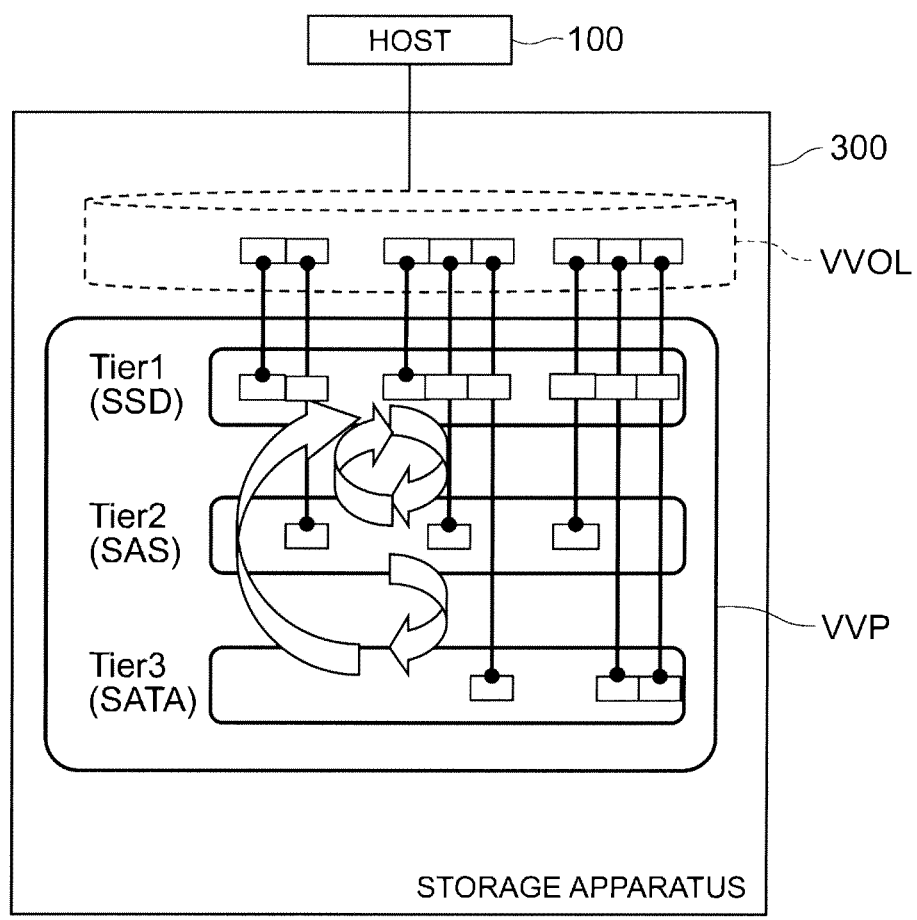
FIG. 6 is an explanatory diagram showing an overview of a data management method according to this embodiment.

Therefore, in this embodiment, optimal page disposition is provided in response to an increase in the sudden access frequency of a specific page by means of the following method. That is, as shown in FIG. 6, if a page is newly assigned due to initial write access from the host 100, the page must be disposed in the first storage tier (Tier 1). Furthermore, even if write access is made to an area to which a page has already been assigned, the page must be disposed (promoted) to the first storage tier (Tier 1) as a result of single access. In addition, pages are disposed sequentially in a lower tier than the current tier (demoted) according to an LRU algorithm, starting with the page with the lowest access frequency.

Accordingly, because the most recently accessed page is always disposed in the uppermost storage tier, the optimal command response time can be expected for pages which are to be accessed on short notice.

As described earlier, if access is made to a newly assigned page or to pages which are disposed in the second storage tier (Tier 2) and the third storage tier (Tier 3), these pages are all migrated to the first storage tier (Tier 1) due to access by the host 100. Further, a page that was originally disposed in the first storage tier (Tier 1) remains disposed in the first storage tier (Tier 1).

According to this embodiment, a page which is newly assigned to the first storage tier (Tier 1) and which is migrated from a storage tier other than the first storage tier (Tier 1) is stored in a blank area (hereinafter blank areas are described with the term margin areas) of the first storage tier (Tier 1). Further, among those pages which are stored in the first storage tier (Tier 1), the page, among the pages with the lowest access frequency, which has the oldest access according to LRU theory is migrated to the second storage tier (Tier 2). Likewise, among those pages which exist in the second storage tier (Tier 2), the page, among the pages with the lowest access frequency, which has the oldest access according to LRU theory is migrated to the third storage tier (Tier 3). Accordingly, for a page which has been accessed once, in order to promote the page to the first storage tier (Tier 1) as a result of this access, a margin area of a predetermined amount can be secured in the first storage tier (Tier 1).

Furthermore, according to this embodiment, the time taken to migrate a page from the first storage tier (Tier 1) to the second storage tier (Tier 2) is calculated according to a limit value of the margin capacity of the first storage tier (Tier 1) designated by the user.

More specifically, the margin capacity (guide margin capacity) which is obtained by adding a predetermined amount to a limit value of the margin capacity designated by the user is calculated (STEP 01). Further, the time when the free capacity of the current first storage tier (Tier 1) is depleted (the first storage tier depletion time) is calculated from the speed of processing I/O requests from the host 100 at the current time (STEP 02). Further, the processing time (guide margin securing time), in a case where a page is demoted from the first storage tier to the second storage tier, for the guide margin capacity is calculated from the speed of demotion from the current first storage tier (Tier 1) to the second storage tier (Tier 2) (STEP 03). Furthermore, by subtracting the guide margin securing time from the first storage tier depletion time, the time of starting the demotion from the first storage tier (Tier 1) to the second storage tier (Tier 2) (the demotion start time) is calculated (STEP 04).

In this embodiment, the processing of STEP 01 to STEP 04 above is carried out every minute, for example, and the demotion start time of demotion from the first storage tier (Tier 1) to the second storage tier (Tier 2) is updated accordingly. As a result, it is possible to execute optimal page disposition which corresponds to the speed of processing of I/O requests from the host 100 and the speed of migration processing between storage tiers.

(1-7) Storage Apparatus Software Configuration

Figure 7:
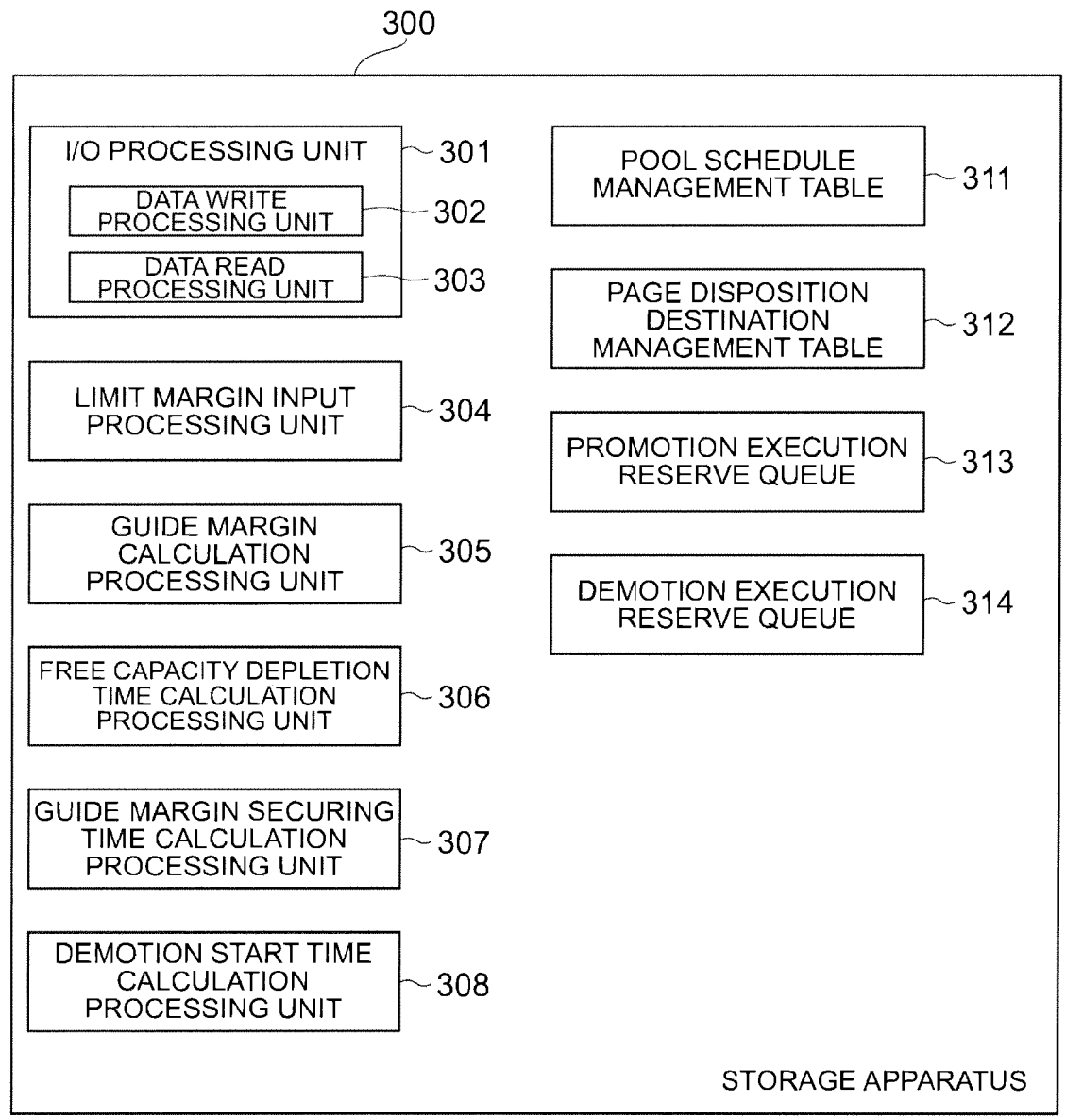
FIG. 7 is a block diagram showing a software configuration of a storage apparatus according to this embodiment.

The software configuration of the storage apparatus 300 will be described next. As shown in FIG. 7, the storage apparatus 300 is configured from an I/O processing unit 301, a limit margin input processing unit 304, a guide margin calculation processing unit 305, a free capacity depletion time calculation processing unit 306, a guide margin securing time calculation processing unit 307, a demotion start time calculation processing unit 308, a pool schedule management table 311, a page disposition destination management table 312, a demotion execution reserve queue 313, and a demotion execution reserve queue 314.

The I/O processing unit 301 is configured from a data write processing unit 302 and a data read processing unit 303. The data write processing unit 302 comprises a function for writing data to the hard disk drives 350 in response to a data write request from the host 100. As mentioned earlier, in this embodiment, if data writing processing to a new page takes place, priority is given to assigning pages of the first storage tier (Tier 1). Furthermore, the data read processing unit 303 comprises a function for reading data from the hard disk drives 350 in response to a data read request from the host 100.

The limit margin input processing unit 304 acquires a limit value (limit margin capacity) for the margin capacity of the first storage tier (Tier 1) designated in response to a user input and provides the limit value to the guide margin calculation processing unit 305. Further, the guide margin calculation processing unit 305 adds a predetermined fixed value to the limit margin capacity provided by the limit margin input processing unit 304 and calculates a value which serves as a guide for the margin capacity of the first storage tier (Tier 1) (the guide margin capacity of the first storage tier). For example, the limit margin capacity is configured, by means of a user input, as 10 to 50% of the total capacity of the first storage tier. Further, the guide margin capacity is calculated by adding 10% of the fixed value as a safety factor to the limit margin capacity. For example, if the total capacity of the first storage tier is 5 TB and the user-designated limit margin is 20%, the guide margin capacity of the first storage tier is calculated as follows.

Guide margin capacity of the first storage tier=total capacity of first storage tier*(user-designated first storage tier limit margin+safety factor)=5 TB* (20%+10%)=1.5 TB.

Furthermore, the guide margin calculation processing unit 305 calculates the capacity corresponding to the fixed ratio (safety factor) for the total capacity of the second storage tier (Tier 2) as a value which serves as a guide for the margin capacity of the second storage tier (Tier 2) (guide map of the second storage tier). For example, in a case where the total capacity of the storage tier is 50 TB and the safety factor is 10%, the guide margin capacity of the second storage tier is calculated as follows.

The guide margin capacity of the second storage tier=total capacity of the second storage tier*safety factor=50 TB*(10%)=5 TB.

The free capacity depletion time calculation processing unit 306 calculates the time when the unused capacity (free capacity) of the first storage tier (Tier 1) is depleted (first storage tier depletion time) from the I/O processing speed of the hosts 100 at the current time and the usage capacity of the first storage tier (Tier 1). Here, the I/O processing speed of the host 100 is the amount of I/O in predetermined time and may also utilize the average value of an actual value [MB/s] for the previous minute, for example.

For example, in a case where the current time is 0:00 on Jan. 1, 2012 and where the I/O processing speed of the host 100 is 100 MB/s and where the free capacity is 4 TB, the free capacity depletion time of the first storage tier is calculated by adding the time estimated until depletion of the free capacity of the first storage tier to the current time.

The time estimated until depletion of the free capacity of the first storage tier=the free capacity/host I/O processing speed=4 TB/100 MB=40000 [s]=11.11 [h]

When the estimated time until free capacity depletion of the first storage tier is added to the current time 2012/1/1, 0:00, the free capacity depletion time of the first storage tier is calculated as 2012/1/1, 11:07.

In addition, the amount of I/O to/from the first storage tier (Tier 1) by the host 100 is, strictly speaking, an I/O amount which is obtained by subtracting the corresponding access amount to existing pages in the first storage tier (Tier 1) from the total I/O amount by the host 100 received by the entire pool. However, hereinafter, the I/O amount by the host also includes the I/O amount obtained by subtracting the access to existing pages in the first storage tier (Tier 1).

Further, the free capacity depletion time calculation processing unit 306 uses the speed of demotion processing from the first storage tier (Tier 1) at the current time to the second storage tier (Tier 2) to calculate the time when the free capacity of the second storage tier is depleted (second storage tier depletion time). The demotion processing speed from the first storage tier (Tier 1) to the second storage tier (Tier 2) may also utilize, for example, the actual value for I/O processing of the host 100 to the second storage tier (Tier 2), the actual value when disposition is actually performed again, catalog usage based on each drive type, or the actual value during an I/O operation test which is internally executed at the time of pool creation.

For example, in a case where the current time is 0:00 on Jan. 1, 2012, where the speed of demotion processing from the first storage tier (Tier 1) to the second storage tier (Tier 2) is 50 MB/s, and where the free capacity is 40 TB, the free capacity depletion time of the second storage tier is calculated by adding the time estimated until the depletion of the free capacity of the second storage tier to the current time.

> The estimated time until the free capacity depletion of the second storage tier=the free capacity/the demotion processing speed from the first storage tier (Tier 1) to the second storage tier (Tier 2)=40 TB/50 MB=800000 [s]=222.22 [h]

When the time estimated until depletion of the free capacity of the second storage tier is added to the current time 0:00, Jan. 1, 2012, the free capacity depletion time of the second storage tier is calculated to be 6:15, Jan. 10, 2012.

The guide margin securing time calculation processing unit 307 uses the speed of demotion processing from the first storage tier (Tier 1) at the current time to the second storage tier (Tier 2) in order to calculate the processing time (guide margin securing time of the first storage tier) in a case where disposition processing is performed again from the first storage tier (Tier 1) to the second storage tier (Tier 2) in an amount corresponding to the guide margin capacity of the first storage tier of the first storage tier (Tier 1) which is calculated by the guide margin calculation processing unit 305. Here, the speed of demotion processing from the first storage tier (Tier 1) to the second storage tier (Tier 2) may also, for example, utilize the actual value of I/O processing of the host 100 to and from the second storage tier (Tier 2), the actual value when disposition is actually performed again, catalog usage based on each drive type, or the actual value during an I/O operation test which is internally executed at the time of pool creation.

For example, in a case where the guide margin capacity of the first storage tier is 1.5 TB and the speed of demotion processing from the first storage tier (Tier 1) to the second storage tier (Tier 2) is 50 MB/s, the guide margin securing time is calculated as follows.

> Guide margin securing time of the first storage tier=guide margin capacity/demotion processing speed from the first storage tier (Tier 1) to the second storage tier (Tier 2)=1.5 [TB]/50 [MB/s]=30000 [s]=8.33 [h].

Furthermore, the guide margin securing time calculation processing unit 307 uses the speed of demotion processing from the second storage tier (Tier 2) at the current time to the third storage tier (Tier 3) in order to calculate the processing time (guide margin securing time of the second storage tier) in a case where disposition processing is performed again from the second storage tier (Tier 2) to the third storage tier (Tier 3) in an amount corresponding to the guide margin capacity of the second storage tier which is calculated by the guide margin calculation processing unit 305.

For example, in a case where the guide margin capacity of the second storage tier is 5 TB and the speed of demotion processing from the second storage tier (Tier 2) to the third storage tier (Tier 3) is 40 MB/s, the guide margin securing time is calculated as follows.

> The guide margin securing time of the second storage tier=guide margin capacity/the speed of demotion processing from the second storage tier (Tier 2) to the third storage tier (Tier 3)=5 [TB]/40 [MB/s]=124000 [s]=34.72 [h].

The demotion start time calculation processing unit 308 calculates the start time of the demotion processing from the first storage tier (Tier 1) to the second storage tier (Tier 2) by back-calculating the guide margin securing time of the first storage tier calculated by the guide margin securing time calculation processing unit 307 from the first storage tier depletion time.

For example, in a case where the first storage tier depletion time is 11:07, Jan. 1, 2012 and where the guide margin securing time of the first storage tier is 8.33 [h], the start time of the demotion processing from the storage tier (Tier 1) to the second storage tier (Tier 2) is 2:47, Jan. 1, 2012.

In addition, the demotion start time calculation processing unit 308 calculates the start time of demotion processing from the second storage tier (Tier 2) to the third storage tier (Tier 3) by back-calculating the guide margin securing time of the second storage tier calculated by the guide margin securing time calculation processing unit 307 from the second storage tier depletion time.

For example, in a case where the second storage tier depletion time is 6:15, Jan. 10, 2012 and where the guide margin securing time of the second storage tier is 34.72 [h], the start time of demotion processing from the second storage tier (Tier 2) to the third storage tier (Tier 3) is 5:32, Jan. 9, 2012.

The pool schedule management table 311 is a table for managing pool configuration information on the basis of information which is input to the pool schedule input screen 500. As shown in FIG. 8, the pool schedule management table 311 is configured from a pool No field 3111, a Tier No field 3112, a limit margin field 3113, a safety factor field 3114, a total capacity field 3115, a free capacity field 3116, a usage capacity field 3117, a guide margin capacity field 3118, a host I/O performance field 3119, a demotion performance field 3120, a Tier depletion time field 3121, a guide margin securing time field 3122, and a demotion start time field 3123.

The pool No field 3111 stores numbers identifying each of the pools. The Tier No field 3112 stores numbers identifying storage tiers of each pool. The limit margin field 3113 stores information indicating the limit margin capacity of the first storage tier (Tier 1). The safety factor field 3114 stores a safety factor for calculating the guide margin capacity of each storage tier. The total capacity field 3115 stores information indicating the total capacity of each storage tier.

The free capacity field 3116 stores information indicating the unused capacity of each storage tier. The usage capacity field 3117 stores information indicating the usage capacity of each storage tier. The guide margin capacity field 3118 stores information indicating the guide margin capacity of each storage tier. The host I/O performance field 3119 stores information indicating the performance of the host 100. The demotion performance field 3120 stores information indicating the performance when demotion is carried out from each storage tier to a storage tier which is one below each storage tier. The tier depletion time field 3121 stores times when the current free capacity of each storage tier is depleted. The guide margin securing time field 3122 stores times when the guide margin capacity is secured. The demotion start time field 3123 stores times when demotion from each storage tier to a storage tier which is one below each storage tier.

As shown in FIG. 9, the pool schedule input screen 500 is an input screen enabling the user to configure various information for creating each pool. For example, a pool number is entered in the input field 501 and a guide margin capacity of the first storage tier of the pool configured in the input field 501 is entered in the input field 502.

Further, the input field 503 enables a RAID level selection to be input from a pulldown display and the input field 504 enables a RAID configuration selection to be entered from a pulldown display. The number of hard disk drives 350 is entered in the input field 505. The type of hard disk drive 350 and the capacity of the hard disk drive 350 are entered in the input field 506. Further, the display field 507 displays information on the hard disk drive 350 assigned to the storage apparatus 300.

The page disposition destination management table 312 is a table for managing information relating to the disposition destination of each page and, as shown in FIG. 10, is configured from a RAID group (RG) No field 3121, a page No field 3122, a counter field 3123, a last access date and time field 3124, a pool No field 3125, a LU No field 3126, an LBA field 3127, a current tier field 3128, and a target tier field 3129.

The RAID group (RG) No field 3121 stores information identifying each RAID group. The page No field 3122 stores information identifying each of the pages. The counter field 3123 stores the number of accesses to each page. The last access date and time field 3124 stores the last access date and time for each page. The pool No field 3125 stores information indicating the pool number to which each page belongs. The LU No field 3126 stores information identifying the logical volume to which each page belongs. The LBA field 3127 stores a unique number (LBA) assigned to each page. The current tier field 3128 stores information indicating the storage tier to which each page currently belongs. The target tier field 3129 stores information indicating the storage tier targeted by each page.

The promotion execution reserve queue 313 is an execution reserve queue for promoting the designated page to the first storage tier (Tier 1) and, as shown in FIG. 11, associates and stores the RAID group number stored in the RAID group (RG) No field 3131 and the page number stored in the page No field 3132. The pages in the execution reserve queue are each promoted to the first storage tier (Tier 1) in the order in which the pages are stored in the promotion execution reserve queue 313.

A demotion execution reserve queue 314A is an execution reserve queue for demoting the designated page from the first storage tier (Tier 1) to the second storage tier (Tier 2) and, as shown in FIG. 12, associates and stores the RAID group number stored in the RAID group (RG) No field 3141 with the page number stored in the page No field 3142. The pages in the execution reserve queue are each demoted from the first storage tier (Tier 1) to the second storage tier (Tier 2) in the order in which the pages are stored in the demotion execution reserve queue 314A.

Figure 13:
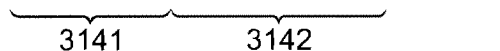
FIG. 13 is a table showing content of a demotion execution reservation queue according to this embodiment.

The demotion execution reserve queue 314B is an execution reserve queue for demoting a designated page from the second storage tier (Tier 2) to the third storage tier (Tier 3) and, as shown in FIG. 13, associates and stores the RAID group number stored in the RAID group (RG) No field 3141 and the page number stored in the page No field 3142. The pages in the execution reserve queue are each demoted from the second storage tier (Tier 2) to the third storage tier (Tier 3) in the order in which the pages are stored in the demotion execution reserve queue 314B.

Figure 14:
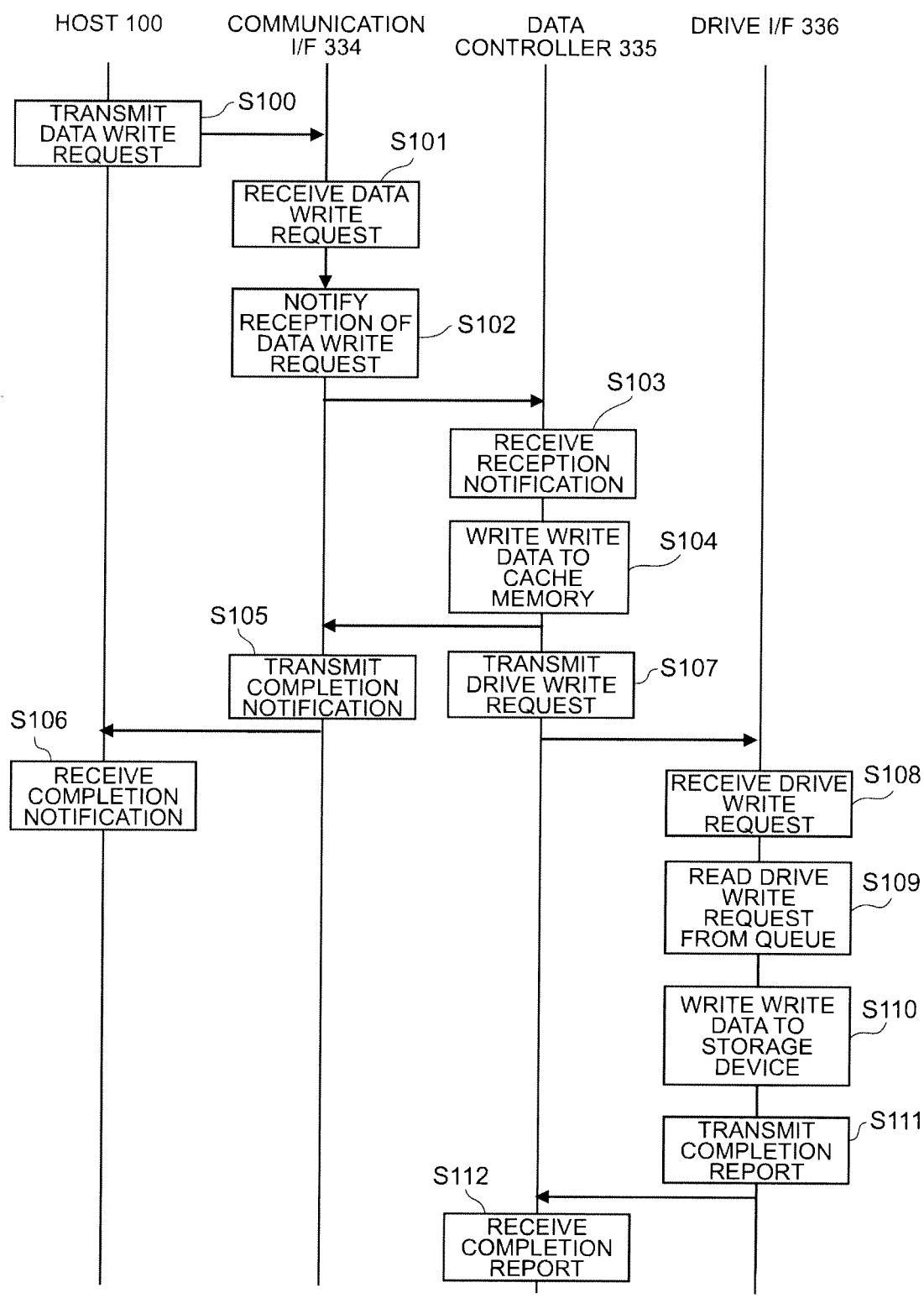
FIG. 14 is a flowchart showing the flow of data write processing according to a computer system according to this embodiment.

(2) Computer System Operation
(2-1) Data I/O Processing of Computer System
(2-1-1) Data Write Processing Data I/O processing in the computer system 1 will be described next. Data write processing of the computer system 1 will first be described. As shown in FIG. 14, the host 100 transmits a data write request to the communication interface 334 of the storage apparatus 300 (hereinafter simply described as a communication interface 334) (S100).

The communication interface 334 receives the data write request transmitted from the host 100 (S101) and communicates the fact that the data write request has been received to the data controller 335 (S102).

The data controller 335 of the storage apparatus 300 (hereinafter described simply as the data controller 335) receives the data write request reception notice from the communication interface 334 (S103) and writes data written to the hard disk drive 350 to the cache memory 337 (S104). Further, the data controller 335 transmits a data write request to the drive interface 336 of the storage apparatus 300 (hereinafter described simply as the drive interface 336) and reports the completion of data writing to the communication interface 334 (S107).

Figure 15:
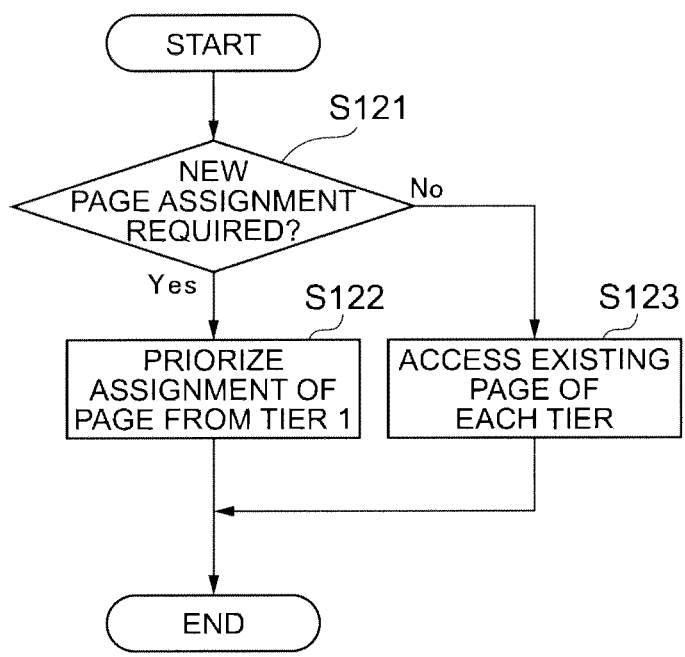
FIG. 15 is a flowchart showing the flow of data write processing according to this embodiment.

In step S107, the data controller 335 determines whether assignment of a new page is required at the time of the data writing requested by the host 100. In specific terms, as shown in FIG. 15, the data controller 335 determines whether assignment of a new page is required at the time of the data writing requested by the host 100 (S121). If it is determined in step S121 that assignment of a new page is required, the data controller 335 instructs the drive interface 336 to prioritize assignment of a page from the first storage tier (Tier 1) (S122). If it is determined in step S122 that new page assignment is not required, that is, if a page has already been assigned to the data write target, [the data controller 335 instructs the drive interface 336 to access the existing page of each storage tier (S123).

After reporting completion of data writing from the data controller 335, the communication interface 334 transmits a completion report to the host 100 (S105). Further, the host 100 receives the data writing completion report from the communication interface 334.

In addition, the drive interface 336 receives a drive write request from the data controller 335 (S108) and reads the drive write request from the queue (S109). Further, the drive interface 336 writes the write data read from the queue in step S109 to the storage device (hard disk drive 350) (S110). The drive interface 336 then transmits a data writing completion report to the data controller 335 (S111). The data controller 335 receives the data writing completion report transmitted from the drive interface 336 in step S111 (S112).

(2-1-2) Data Read Processing

Figure 16:
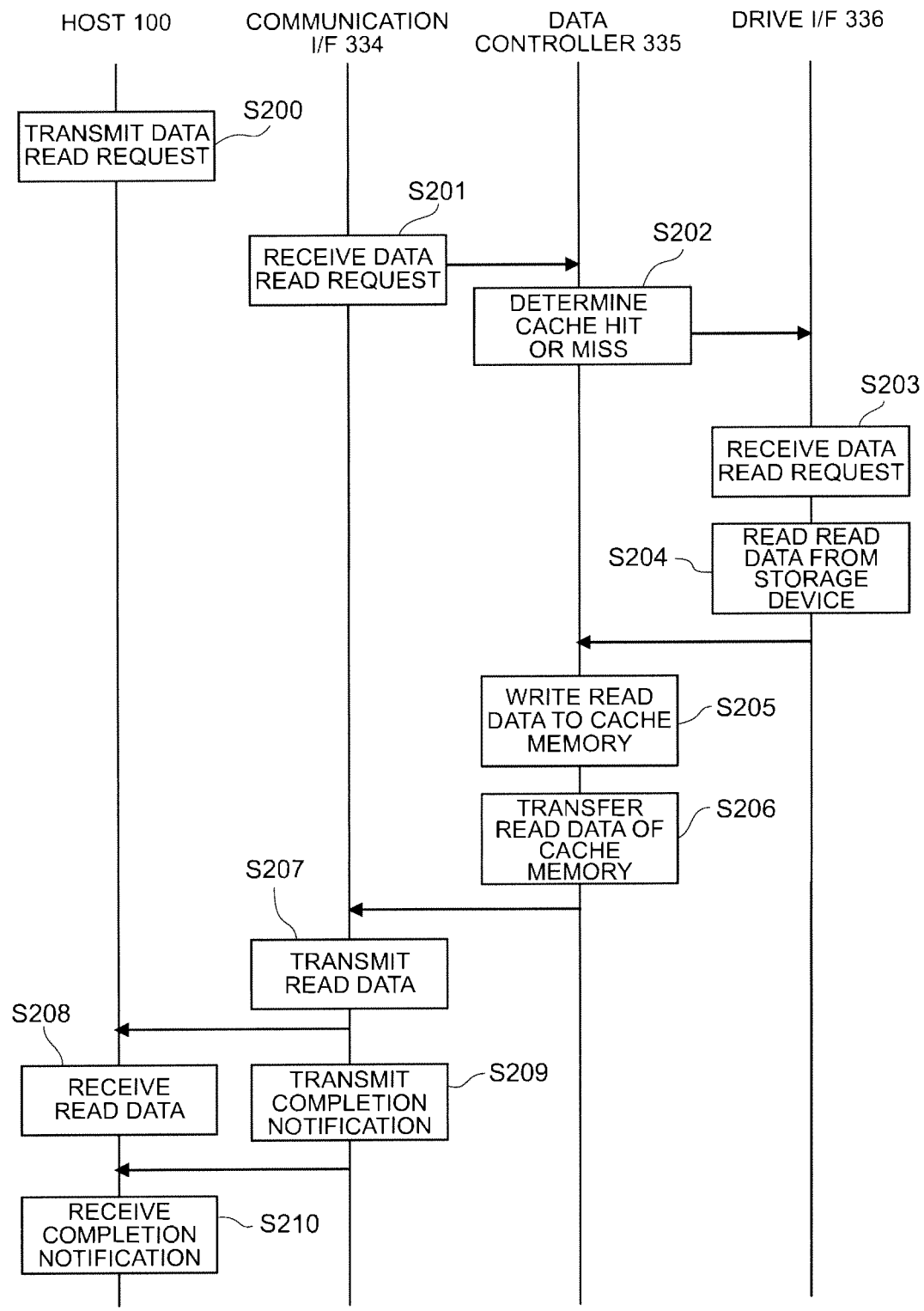
FIG. 16 is a flowchart showing the flow of data read processing according to the computer system according to this embodiment.
Figure 17:
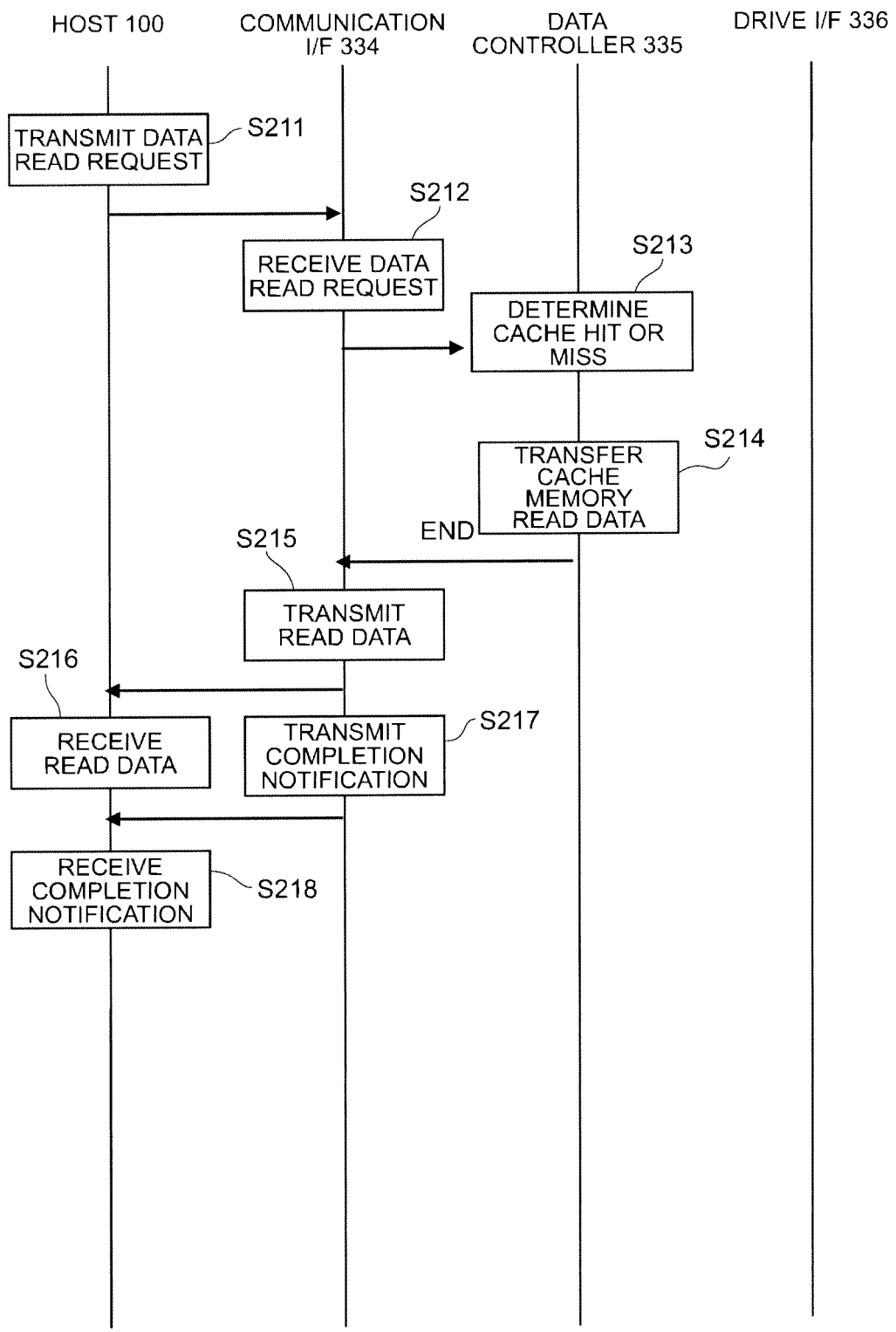
FIG. 17 is a flowchart showing the flow of data read processing according to the computer system according to this embodiment.

Data read processing of computer system 1 will be described next. FIG. 16 shows a case where a cache miss takes place during reading, that is, where the read target data is not stored in the cache memory 337. Further, FIG. 17 shows a case where a cache hit takes place during data reading, that is, where the read target data is stored in the cache memory 337.

As shown in FIG. 16, the host 100 transmits a data read request to the communication interface 334 (S200). The communication interface 334 receives the data read request transmitted from the host 100 and notifies the data controller 335 (S201).

The data controller 335 which receives the data read request from the communication interface 334 determines whether or not a cache hit or cache miss has taken place, that is, whether read target data is stored in the cache memory 337 (S202). If a cache miss is determined in step S202, that is, if read target data is not stored in the cache memory 337, the data controller 335 transmits a data read request to the drive interface 336.

The drive interface 336 receives a data read request from the data controller 335 (S203), reads read target data from the storage device (hard disk drive 350) (S204) and transmits the data to the data controller 335.

The data controller 335 writes read data received from the drive interface 336 to the cache memory 337 (S205) and transfers the data to the communication interface 334 (S206).

The communication interface 334 transmits the read data transferred from the data controller 335 to the host 100

(S207). The host 100 receives the read data transmitted from the communication interface 334 (S208). Further, the [communication interface 334] transmits a data reading completion report to the host 100 (S209). The host 100 receives the data reading completion report transmitted from the communication interface 334 (S210).

As shown in FIG. 17, the host 100 transmits a data read request to the communication interface 334 (S211). The communication interface 334 receives a data read request transmitted from the host 100 and notifies the data controller 335 (S212).

The data controller 335 which receives the data read request from the communication interface 334 determines whether or not a cache hit or cache miss has taken place, that is, whether read target data is stored in the cache memory 337 (S213). If a cache hit is determined in step 5213, that is, if read target data is stored in the cache memory 337, the data controller 335 transfers the read target data of the cache memory 337 to the communication interface 334 (S214).

The communication interface 334 transmits the read data transferred from the data controller 335 to the host 100 (S215). The host 100 receives the read data transmitted from the communication interface 334 (S216). In addition, [the communication interface 334] transmits the data reading completion report to the host 100 (S217). The host 100 receives the data reading completion transmitted from the communication interface 334 (S218).

(2-2) Margin Capacity Securing Processing of Storage Apparatus

The margin capacity securing processing of the storage apparatus will be described next. Note that, although the main subject of the various processing in the following description are programs (limit margin input processing unit and so on), it goes without saying that, in reality, the data controller 335 of the storage apparatus 300 executes [the various processing] on the basis of such programs.

The margin capacity securing processing for securing the margin capacity of the first storage tier (Tier 1) and the second storage tier (Tier 2) will first be described hereinbelow. As mentioned earlier, in this embodiment, in order to promote a page which has been accessed once to the first storage tier (Tier 1) as a result of the access, it is necessary to secure a predetermined amount of margin area in the first storage tier (Tier 1). Further, the time taken for the page of the first storage tier (Tier 1) to be demoted to a page of the second storage tier (Tier 2) is calculated according to the speed of processing of the I/O requests from the host 100. Accordingly, an optimal command response time can be expected for access from the host 100 and optimal page disposition can be executed according to the speed of processing of the I/O requests from the host 100.

Page migration processing to the first storage tier (promotion processing) and page migration processing from an upper tier to a lower tier (demotion processing) will be described next. As mentioned earlier, according to this embodiment, in a case where access is made to a newly assigned page or to a page which is disposed in the second storage tier (Tier 2) and the third storage tier (Tier 3), all such pages are migrated (promoted) to the first storage tier (Tier 1). Further, pages originally disposed in the first storage tier (Tier 1) are disposed as is in the first storage tier (Tier 1). Further, migration from the first storage tier (Tier 1) to the second storage tier (Tier 2) and page migration (demotion) from the second storage tier (Tier 2) to the third storage tier (Tier 3) are executed according to the demotion time calculated in the margin capacity securing processing above.

(2-2-1) Limit Margin Input Processing

Figure 18:
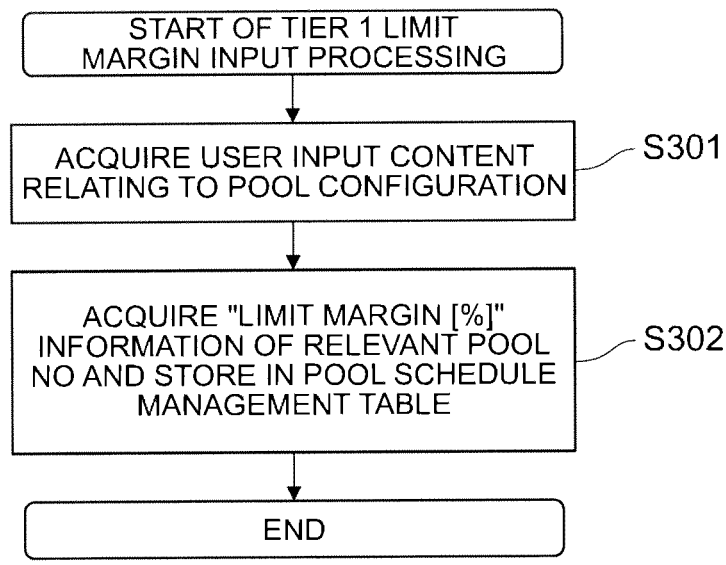
FIG. 18 is a flowchart showing limit margin input processing according to this embodiment.

As shown in FIG. 18, the limit margin input processing unit 304 acquires information relating to pool configuration input by the user via the pool schedule input screen 500 shown in FIG. 9 (S301). Further, the limit margin input processing unit 304 acquires limit margin information corresponding to the pool designated in step S301 and stores the limit margin information in the limit margin field 3113 of the first storage tier (Tier 1) of the pool of the pool schedule management table 311 (S302).

(2-2-2) Guide Margin Calculation Processing

Figure 19:
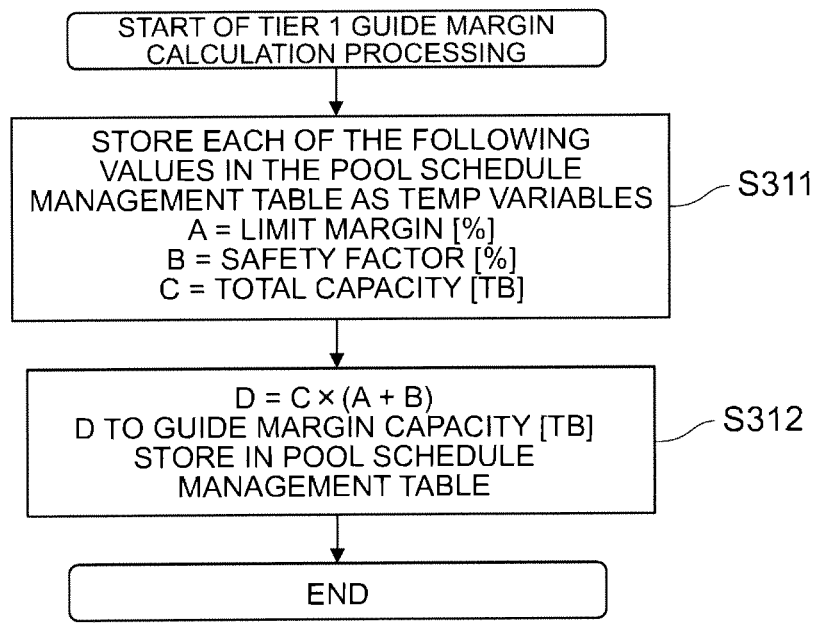
FIG. 19 is a flowchart showing the flow of guide margin calculation processing according to this embodiment.

As shown in FIG. 19, the guide margin calculation processing unit 305 stores the value of the limit margin field 3113 of the first storage tier (Tier 1) of the pool in the pool schedule management table 311 as a temp variable A, stores the value of the safety factor field 3114 as a temp variable B and stores the value of the total capacity field 3115 as a temp variable C (S311). Further, the guide margin calculation processing unit 305 calculates the guide margin capacity by means of the following equation and stores this capacity as a temp variable D, and stores the value of the variable D in the guide margin capacity field 3118 of the first storage tier (Tier 1) of the pool in the pool schedule management table 311 (S312).

$$D(\text{guide margin capacity TB}) = C(\text{total capacity TB}) * (A(\text{limit margin \%}) + B(\text{safety factor \%}))$$

Figure 20:
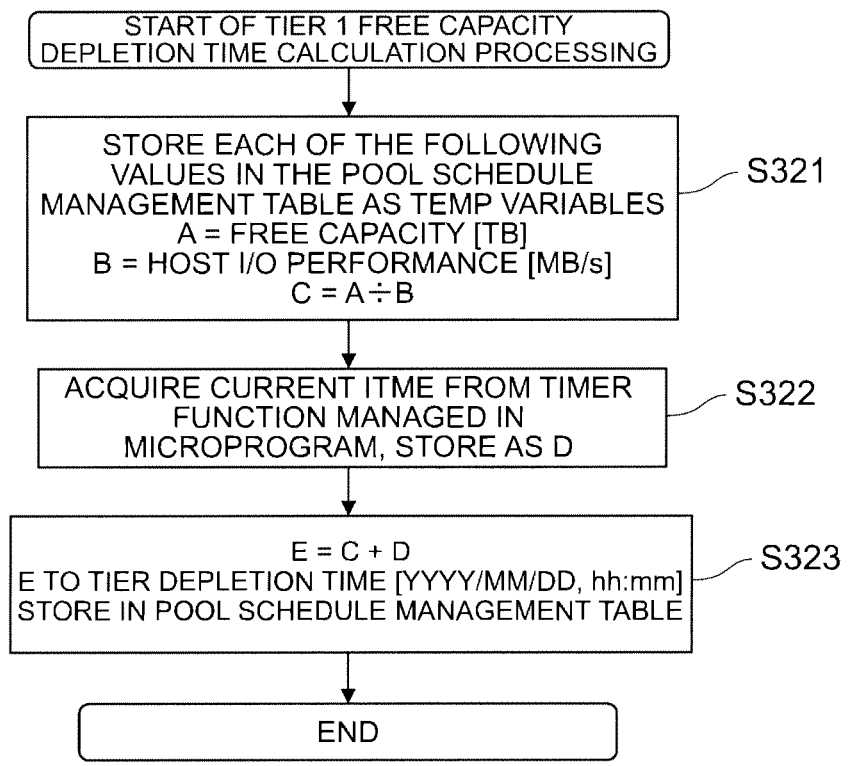
FIG. 20 is a flowchart showing the flow of free capacity depletion time calculation processing according to this embodiment.

(2-2-3) Free Capacity Depletion Time Calculation Processing of the First Storage Tier As shown in FIG. 20, the free capacity depletion time calculation processing unit 306 stores the value of the free capacity field 3116 of the first storage tier (Tier 1) of the pool in the pool schedule management table 311 as the temp variable A, stores the value of the host I/O performance field 3119 as a temp variable B, and stores the A/B value as a temp variable C (free capacity depletion estimated time) (S321).

Further, the free capacity depletion time calculation processing unit 306 acquires the current time from a timer function managed in the microprogram of the storage apparatus 300 and stores the current time as a temp variable D (S322). Furthermore, the free capacity depletion time calculation processing unit 306 calculates the free capacity depletion time of the first storage tier by means of the following equation and stores this time in the Tier depletion time field 3121 of the first storage tier of the pool of the pool schedule management table 311 (S323).

$$E(\text{Tier depletion time YYYY/MM/DD, hh:mm}) = C(\text{free capacity depletion estimated time}) + D(\text{current time})$$

(2-2-4) Guide Margin Securing Time Calculation Processing

Figure 21:
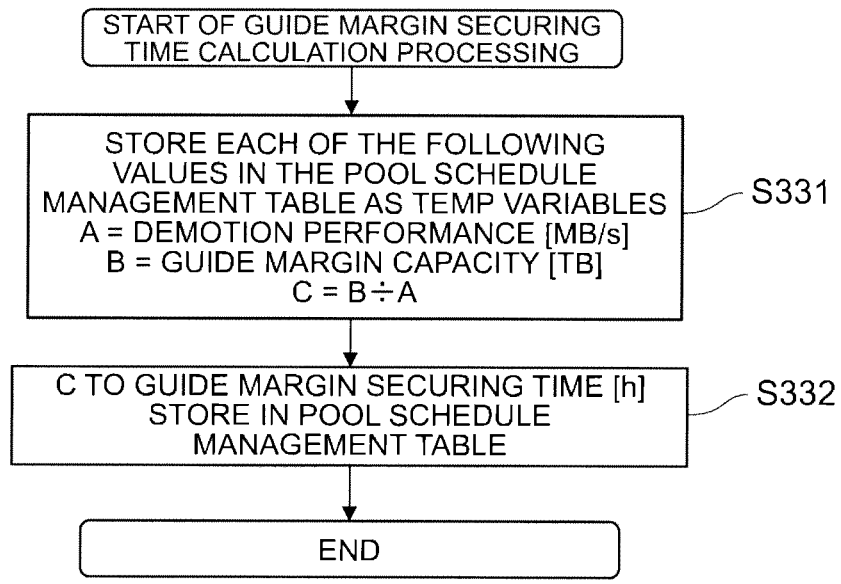
FIG. 21 is a flowchart showing the flow of guide margin securing time calculation processing according to this embodiment.

As shown in FIG. 21, the guide margin securing time calculation processing unit 307 stores the value of the demotion performance field 3123 of the first storage tier of the pool in the pool schedule management table 311 as a temp variable A, stores the value of the guide margin capacity field 3122 as a temp variable B, and stores the value of A/B as a temp variable C (guide margin securing time) (S331).

Furthermore, the guide margin securing time calculation processing unit 307 stores C (the guide margin securing time) calculated in step S331 in the guide margin securing time field 3122 of the first storage tier in the pool of the pool schedule management table 311 (S332).

Figure 22:
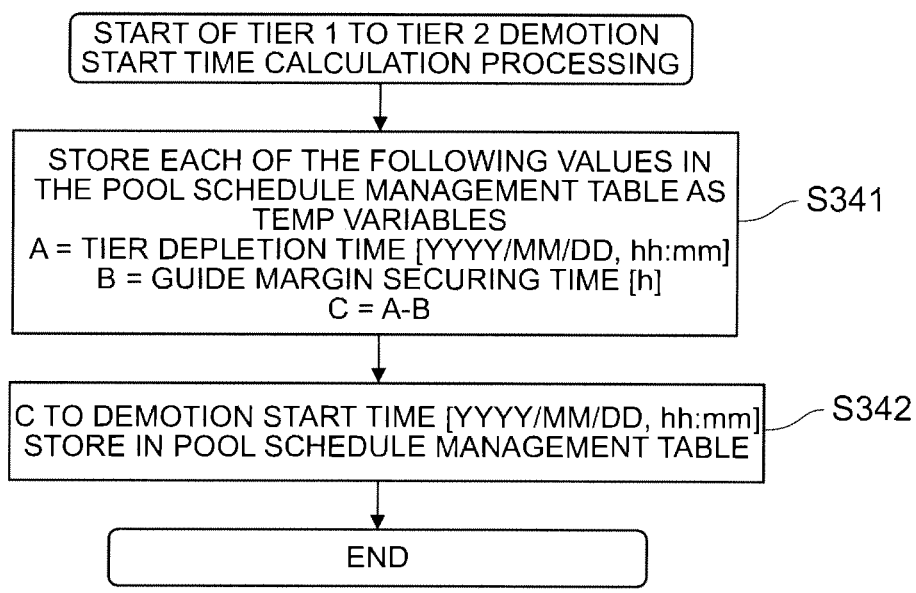
FIG. 22 is a flowchart showing the flow of demotion start time calculation processing according to this embodiment.

(2-2-5) Processing to Calculate the Start Time of Demotion from First Storage Tier to Second Storage Tier As shown in FIG. 22, the demotion start time calculation processing unit 308 stores the value of the Tier depletion time field 3121 of the first storage tier (Tier 1) of the pool in the pool schedule management table 311 as a temp variable A, stores the value of the guide margin securing time field 3122 as a temp variable B, and stores a value A-B as a temp variable C (demotion start time) (S341).

Furthermore, the demotion start time calculation processing unit 308 stores C (demotion start time) which was calculated in step S341 in the demotion start time field 3123 of the first storage tier of the pool in the pool schedule management table 311 (S342).

(2-2-6) Guide Margin Calculation Processing

Figure 23:
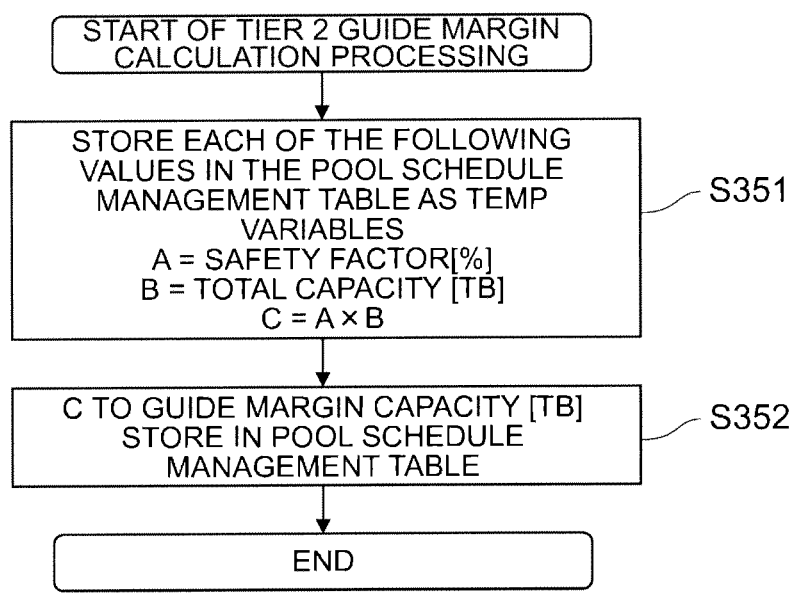
FIG. 23 is a flowchart showing the flow of guide margin calculation processing according to this embodiment.

As shown in FIG. 23, the guide margin calculation processing unit 305 stores the value of the safety factor field 3114 of the second storage tier (Tier 2) of the pool in the pool schedule management table 311 as a temp variable A, stores the value of the total capacity field 3115 as a temp variable B, and stores the value of A*B as a temp variable C (guide margin capacity) (S351).

Further, the guide margin calculation processing unit 305 stores C (the guide margin capacity) which was calculated in step S351 in the guide margin capacity field 318 of the pool schedule management table 311 (S352).

Figure 24:
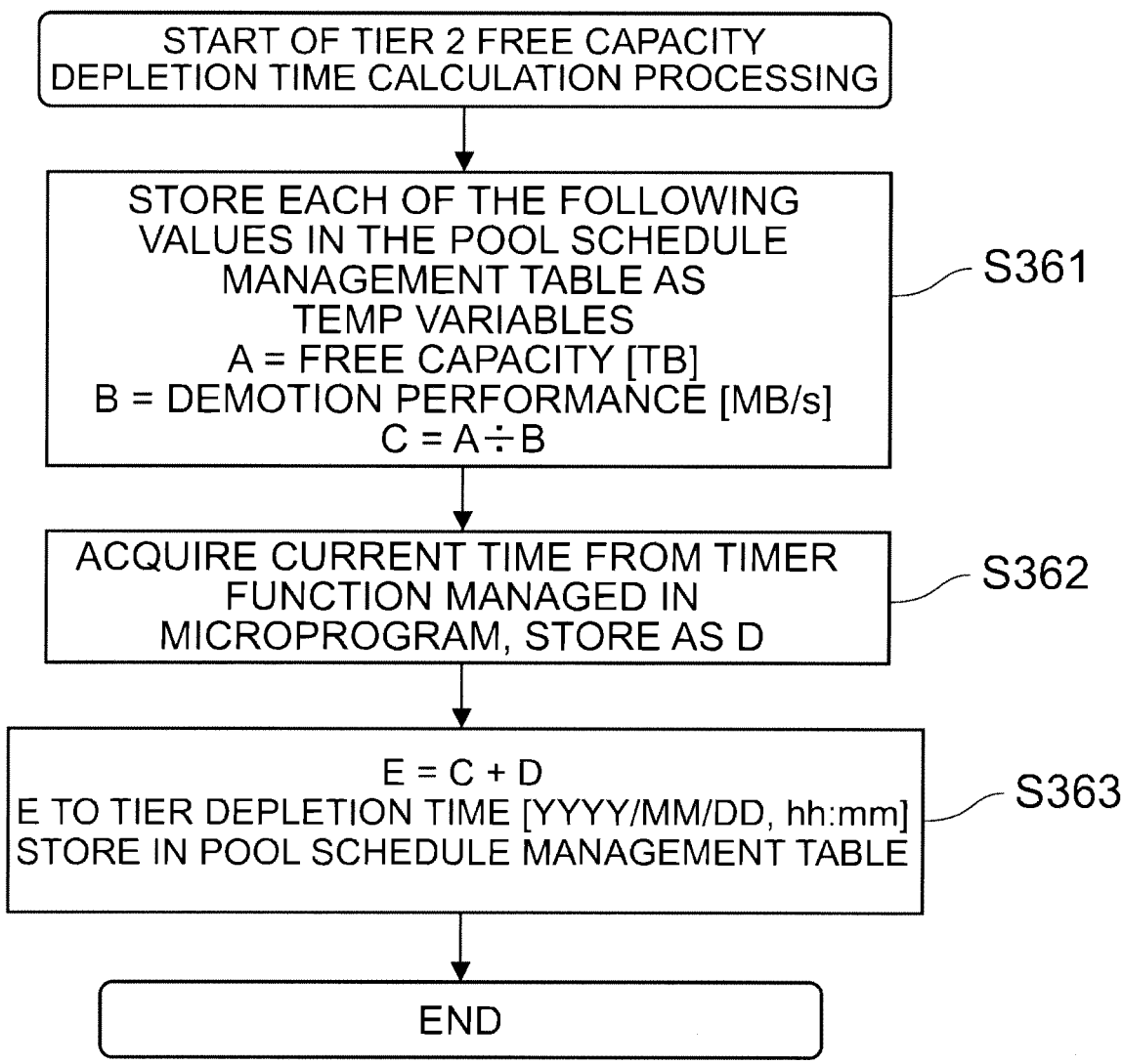
FIG. 24 is a flowchart showing the flow of free capacity depletion time calculation processing according to this embodiment.

(2-2-7) Free Capacity Depletion Time Calculation Processing of Second Storage Tier As shown in FIG. 24, the free capacity depletion time calculation processing unit 306 stores the value of the free capacity field 3116 of the second storage tier (Tier 2) of the pool in the pool schedule management table 311 as a temp variable A, stores the value of the demotion performance field 3120 of the second storage tier (Tier 2) as a temp variable B, and stores the value of A/B as a temp variable C (free capacity depletion estimated time) (S361).

Further, the free capacity depletion time calculation processing unit 306 acquires the current time from the timer function managed in the microprogram of the storage apparatus 300 and stores the current time as a temp variable D (S362). Further, the free capacity depletion time calculation processing unit 306 calculates the free capacity depletion time of the first storage tier by means of the following equation and stores this time in the tier depletion time field 3121 of the second storage tier of the pool in the pool schedule management table 311 (S363).

$$E(\text{Tier depletion time YYYY/MM/DD, hh:mm})=C \text{ (free capacity depletion estimated time)}+D(\text{current time})$$

(2-2-8) Guide Margin Securing Time Calculation Processing

Figure 25:
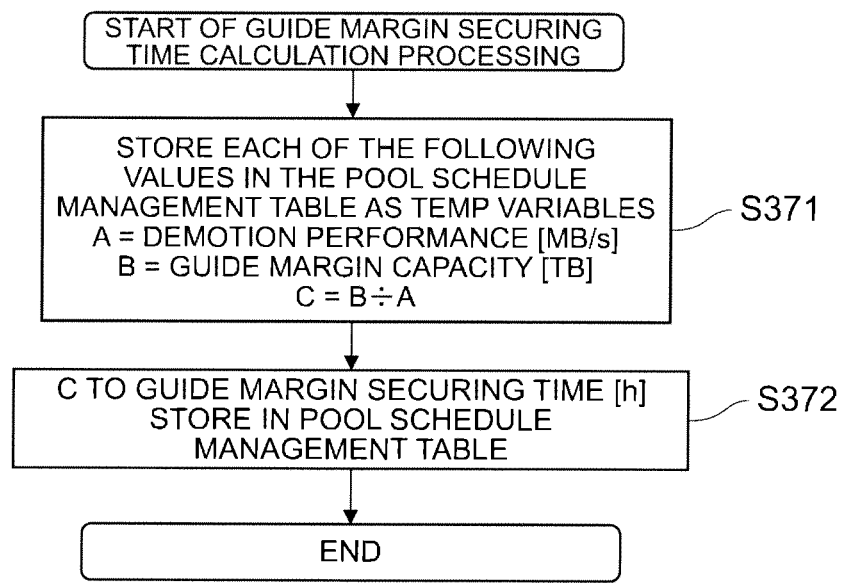
FIG. 25 is a flowchart showing the flow of guide margin securing time calculation processing according to this embodiment.

As shown in FIG. 25, the guide margin securing time calculation processing unit 307 stores the value of the demotion performance field 3123 of the second storage tier of the pool in the pool schedule management table 311 as a temp variable A, stores the value of the guide margin capacity field 3122 as a temp variable B, and stores the value of A//B as a temp variable C (guide margin securing time) (S371).

Further, the guide margin securing time calculation processing unit 307 stores C (guide margin securing time) which is calculated in step S371 in the guide margin securing time field 3122 of the second storage tier (Tier 2) of the pool in the pool schedule management table 311 (S372).

Figure 26:
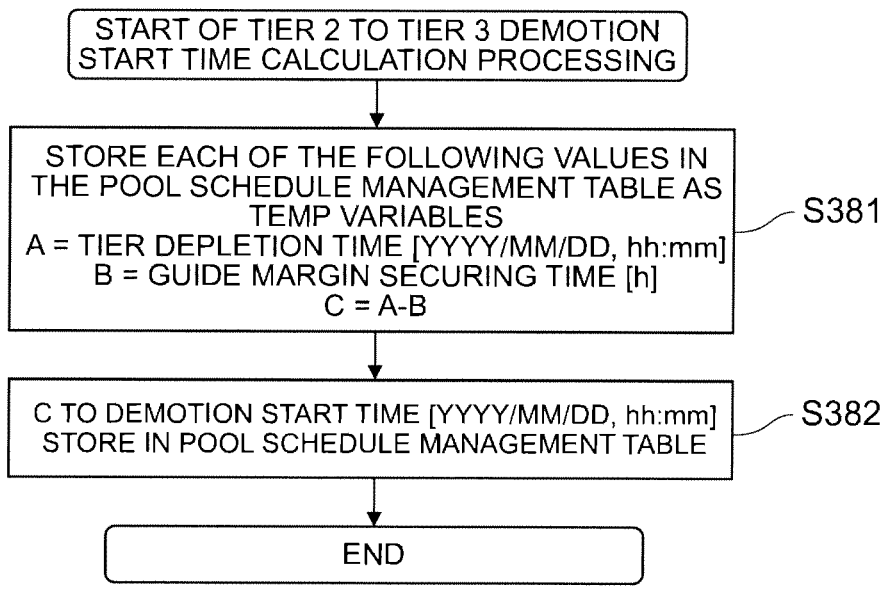
FIG. 26 is a flowchart showing the flow of demotion start time calculation processing according to this embodiment.

(2-2-9) Processing to Calculate the Start Time of Demotion from the Second Storage Tier to the Third Storage Tier As shown in FIG. 26, the demotion start time calculation processing unit 308 stores the value of the tier depletion time field 3121 of the second storage tier (Tier 2) of the pool in the pool schedule management table 311 as a temp variable A, stores the value of the guide margin securing time field 3122 as a temp variable B, and stores the value of A-B as a temp variable C (demotion start time) (S381).

Further, the demotion start time calculation processing unit 308 stores C (the demotion start time) which is calculated in step S341 in the demotion start time 3123 of the second storage tier (Tier 2) of the pool in the pool schedule management table 311 (S382).

(2-3) Promotion Processing and Demotion Processing of Storage Apparatus

Promotion processing and demotion processing of storage apparatus will be described next. Note that although, in the following description, the main subject of the promotion processing and demotion processing is the I/O processing unit 301, it goes without saying that, in reality, the data controller 335 of the storage apparatus 300 executes [the various processing] on the basis of a program [of the I/O processing unit 301].

(2-3-1) Promotion Determination Processing

Figure 27:
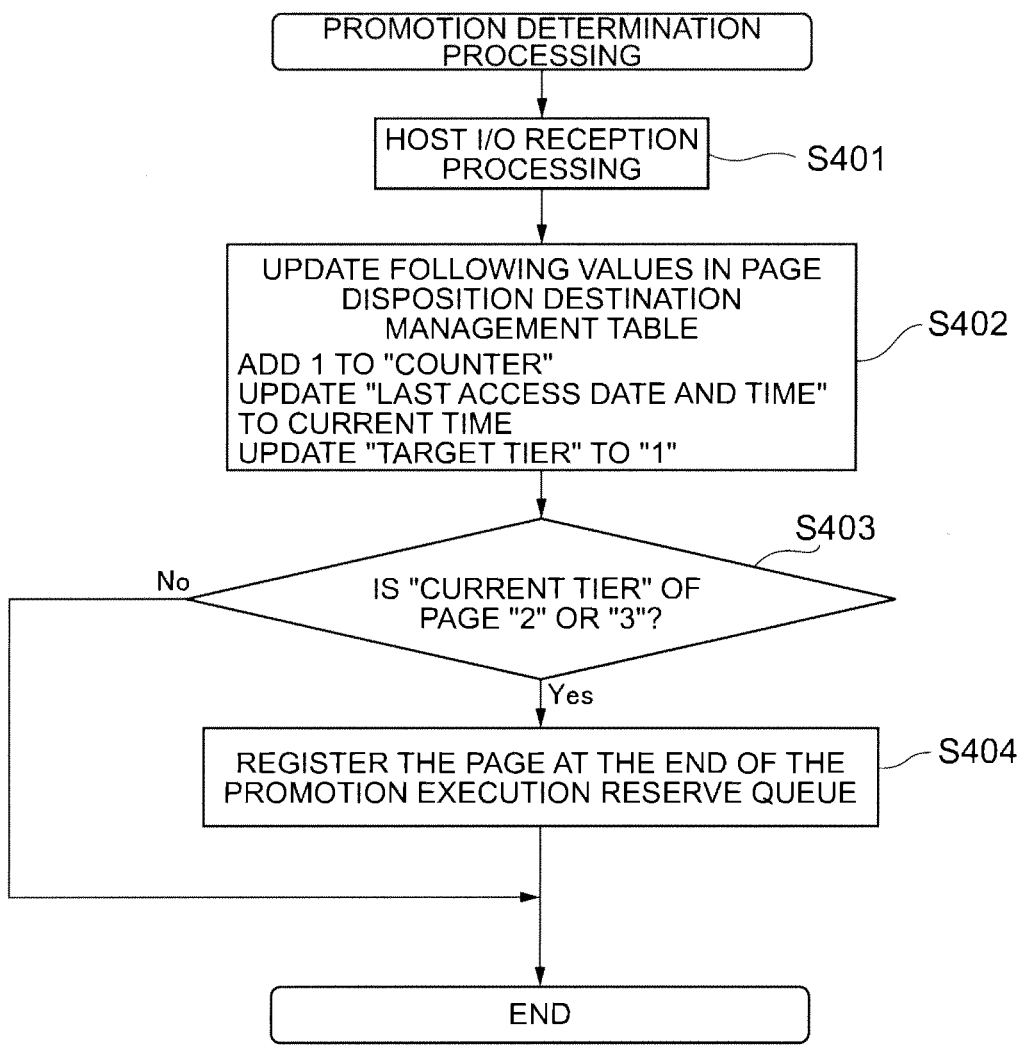
FIG. 27 is a flowchart showing the flow of promotion determination processing according to this embodiment.

As shown in FIG. 27, the I/O processing unit 301 receives I/O from the host 100 (S401). Further, the I/O processing unit 301 updates the page counter field 3122, the last access date and time field 3124, and the target tier field 3129 corresponding to the I/O request in the page disposition destination management table 312. More specifically, the I/O processing unit 301 adds 1 to the value of the counter field 3122. Further, the I/O processing unit 301 updates the value of the last access date and time field 3124 to the current time. Further, the I/O processing unit 301 updates the value of the target tier field 3129 to 1.

Further, the I/O processing unit 301 refers to the current tier field 3128 of the page in the page disposition destination management table 312 in order to determine whether the current tier of the page is a tier other than 1 (Tier 2 or Tier 3) (S403).

If it is determined in step S403 that the current tier of the page is not a tier other than 1, that is, that the current tier is 1, [the I/O processing unit 301] ends the processing as is. If, on the other hand, it is determined in step 5403 that the current tier of the page is either 2 or 3, [the I/O processing unit 301] registers the page at the end of the promotion execution reserve queue 313 (S404).

(2-3-2) Promotion Processing

Figure 28:
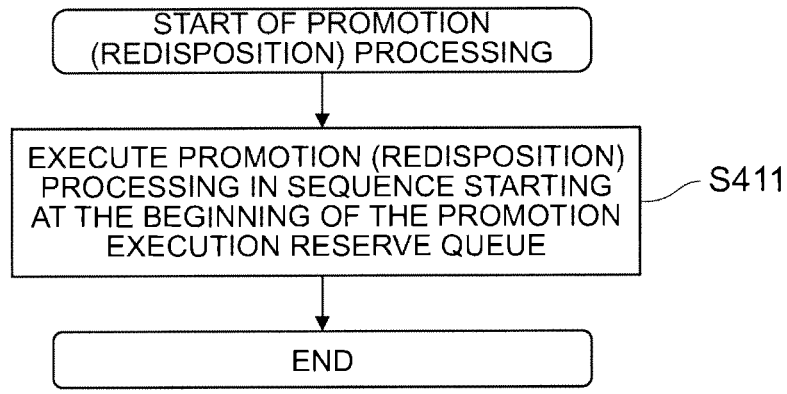
FIG. 28 is a flowchart showing the flow of promotion processing according to this embodiment.

As shown in FIG. 28, the I/O processing unit 301 refers to the promotion execution reserve queue 313 and executes promotion processing on the queue stored in the promotion execution reserve queue 313 in order starting at the beginning (S411). More specifically, the I/O processing unit 301 migrates pages corresponding to the queue stored in the promotion execution reserve queue 313 to the first storage tier (Tier 1) from the second storage tier (Tier 2) or the third storage tier (Tier 3).

(2-3-3) Demotion Determination Processing

Figure 29:
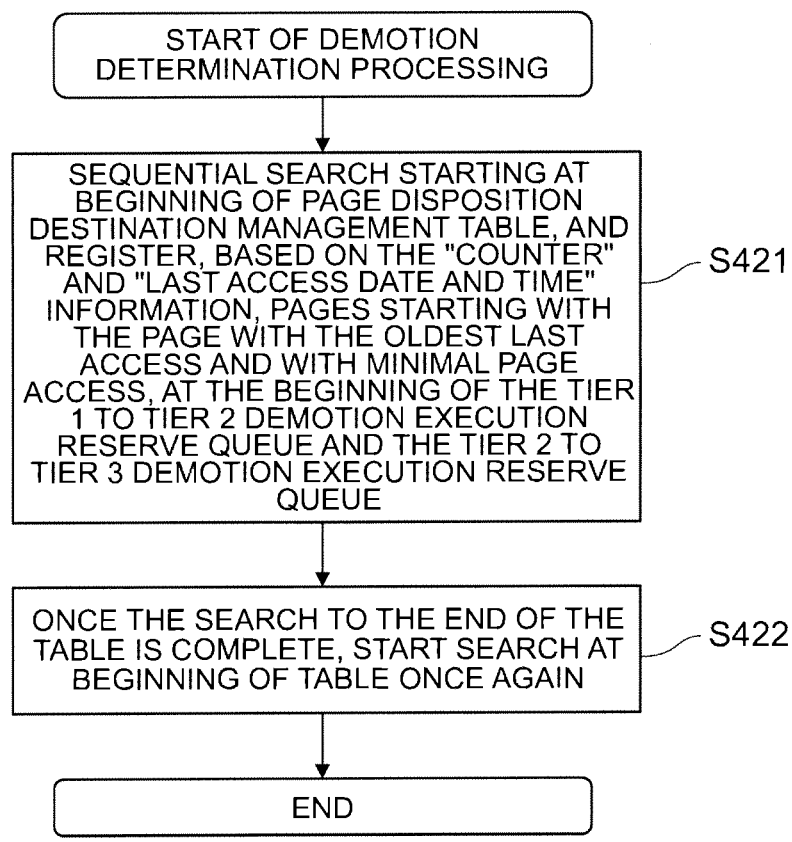
FIG. 29 is a flowchart showing the flow of demotion determination processing according to this embodiment.

As shown in FIG. 29, the I/O processing unit 301 refers to the page disposition destination management table 312 and, based on the information stored in the counter field 3123 and the last access date and time field 3124, registers the page with the oldest last access date and time and with a small counter value, that is, minimal page access, in the demotion execution reserve queue as the demotion target page (S421). More specifically, where pages targeted for demotion are concerned, the I/O processing unit 301 registers pages demoted from the second storage tier (Tier 2) to the first storage tier (Tier 1) in the demotion execution reserve queue 314A for demotion from Tier 2 to Tier 1, and registers pages demoted from the third storage tier (Tier 3) to the second storage tier (Tier 2) in the demotion execution reserve queue 314B for demotion from Tier 3 to Tier 2.

Furthermore, after ending the search of step S421 as far as the end of the entries in the page disposition destination management table 312, the I/O processing unit 301 starts searching from the beginning of the table once again (S422).

(2-3-4) Demotion Processing from First Storage Tier to Second Storage Tier

Figure 30:
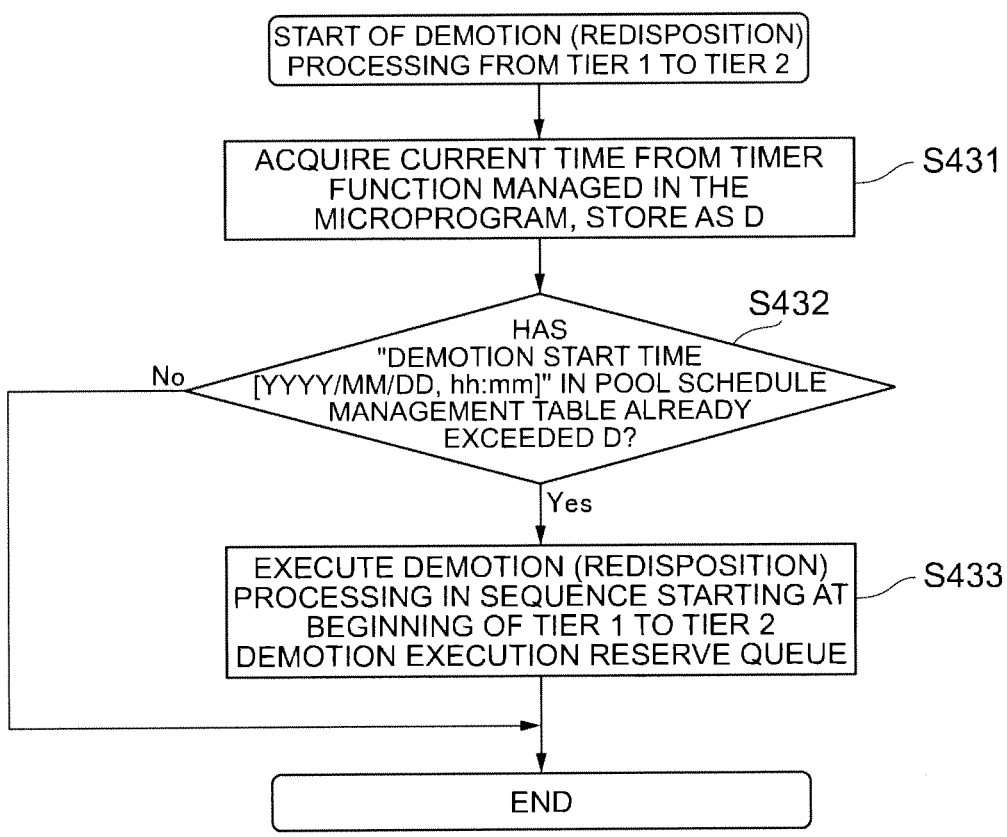
FIG. 30 is a flowchart showing the flow of demotion processing according to this embodiment.

As shown in FIG. 30, the I/O processing unit 301 acquires the current time from the timer function managed in the microprogram in the storage apparatus 300 and stores the current time as a temp variable D (S431). Furthermore, [the I/O processing unit 301] determines whether the time stored in the demotion start time field 3123 of the first storage tier (Tier 1) in the pool schedule management table 311 already exceeds the time of the temp variable D (S432).

Further, if it is determined in step S432 that the time stored in the demotion start time field 3123 already exceeds the time of the temp variable D, the I/O processing unit 301 executes demotion processing in order starting at the beginning of the queue registered in the execution reserve queue 314A [for demotion] from the first storage tier (Tier 1) to the second storage tier (Tier 2) (S433). If, on the other hand, it is determined in step S432 that the time stored in the demotion start time field 3123 does not already exceed the time of the temp variable D, the I/O processing unit 301 ends the processing.

(2-3-5) Demotion Processing from Second Storage Tier to Third Storage Tier

Figure 31:
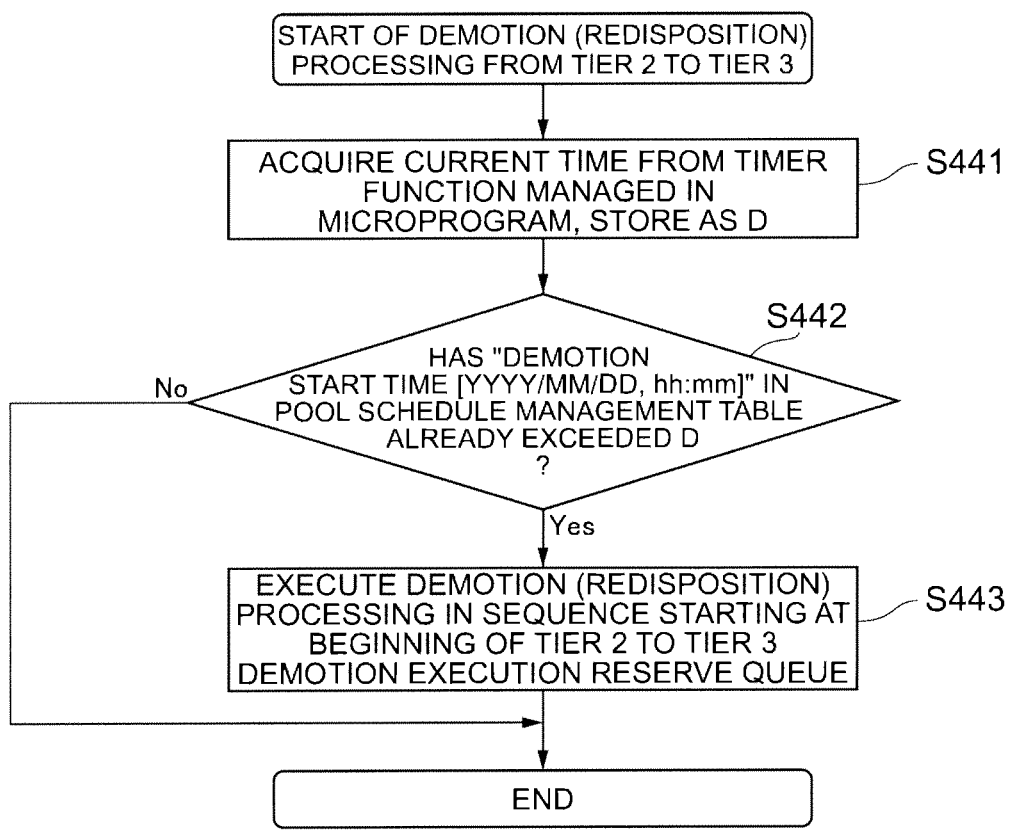
FIG. 31 is a flowchart showing the flow of demotion processing according to this embodiment.

As shown in FIG. 31, the I/O processing unit 301 acquires the current time from the timer function managed in the microprogram in the storage apparatus 300 and stores the current time as a temp variable D (S441). Further, [the I/O processing unit 301] determines whether the time stored in the demotion start time field 3123 of the second storage tier (Tier 2) in the pool schedule management table 311 already exceeds the time of the temp variable D (S442).

Further, if it is determined in step S442 that the time stored in the demotion start time field 3123 already exceeds the time of the temp variable D, the I/O processing unit 301 executes demotion processing in order starting at the beginning of the queue registered in the execution reserve queue 314A [for demotion] from the first storage tier (Tier 1) to the second storage tier (Tier 2) (S443). If, on the other hand, it is determined in step S442 that the time stored in the demotion start time field 3123 does not already exceed the time of temp variable D, the I/O processing unit 301 ends the processing.

(3) Advantageous Effects of Embodiment

As mentioned earlier, according to this embodiment, if access is made to a newly assigned page or to pages which are disposed in the second storage tier (Tier 2) and the third storage tier (Tier 3), these pages are all migrated (promoted) to the first storage tier (Tier 1). Further, a page that was originally disposed in the first storage tier (Tier 1) remains disposed in the first storage tier (Tier 1). In addition, for pages which have been accessed once, in order to promote these pages to the first storage tier (Tier 1) as a result of the access, it is necessary to secure a predetermined amount of margin area in the first storage tier (Tier 1). Further, the time taken for the page of the first storage tier (Tier 1) to be demoted to a page of the second storage tier (Tier 2) is calculated according to the speed of processing of the 1/0 requests from the host 100, and page migration (demotion) from the first storage tier (Tier 1) to the second storage tier (Tier 2) as well as migration from the second storage tier (Tier 2) to the third storage tier (Tier 3) are executed according to the calculated demotion time. Accordingly, an optimal command response time can be expected for access from the host 100 and optimal page disposition can be executed according to the speed of processing of the I/O requests from the host 100.

(4) Further Embodiments

For example, the steps in the processing of the storage apparatus 300 of the present specification need not necessarily each be processed chronologically in the order illustrated by the flowchart. In other words, the steps in the processing of the storage apparatus 300 may also each be executed in parallel using different processes.

Furthermore, a computer program can also be created in order to cause hardware such as the CPU, ROM, and RAM built into the storage apparatus 300 or the like to exhibit the same functions as each of the above configurations of the storage apparatus 300. A storage medium which stores the computer program is also provided.

Moreover, although the disk controller 330 of the storage apparatus 300 realizes the various functions of the present invention on the basis of various programs stored in the storage apparatus 300 according to the foregoing embodiment, the present invention is not limited to this example. For example, the disk controller 330 may also be provided in another separate apparatus from the storage apparatus 300 in order to realize various functions in co-operation with the disk controller 330. Furthermore, the various programs stored in the storage apparatus 300 may also be provided in another separate device from the storage apparatus 300 so that the various functions are realized as a result of the programs being called to the disk controller 330.

Reference Signs List

1 Computer system
100 Host
200 Management server
300 Storage apparatus
304 Limit margin input processing unit
305 Guide margin calculation processing unit
306 Free capacity depletion time calculation processing unit
307 Guide margin securing time calculation processing unit
308 Demotion start time calculation processing unit
310 Base enclosure
311 Pool schedule management table
312 Page disposition destination management table
313 Promotion execution reserve queue
314 Demotion execution reserve queue
320 Additional enclosure
330 Controller
330 Disk controller
350 Hard disk drive

The invention claimed is:

1. A storage apparatus which is coupled to a host which issues a data I/O request via a network, comprising:
storage devices of a plurality of types of varying performance; and
a control unit configured to manage each of storage areas provided by the storage devices of the plurality of types by means of storage tiers of a plurality of different types, and to assign the storage areas in page units to a virtual volume from any of the storage tiers among the storage tiers of the plurality of types in response to a request to write the data from the host,
wherein, if the data I/O request is received from the host, the control unit is configured to assign storage areas in page units from the uppermost storage tier to the target areas of the virtual volume corresponding to the data I/O request, and wherein the control unit is configured to change the page unit storage area assignment to predetermined areas of the virtual volume from an upper storage tier to a lower storage tier in accordance with the speed of processing of the data I/O request from the host, wherein the control unit is configured to take a blank area of a predetermined capacity of the uppermost storage tier according to a user designation, wherein the control unit is configured to calculate a time when unused capacity of the uppermost storage tier is depleted and time for securing the blank area on the basis of the speed of processing of the data I/O request from the host, and wherein, based on the time when the unused capacity is depleted and the time for securing the blank area, the control unit is configured to change page unit storage area assignment to predetermined areas of the virtual volume from the uppermost storage tier to a storage tier below the uppermost storage tier.

2. The storage apparatus according to claim 1, wherein, if a target area of the virtual volume corresponding to the data I/O request is an area to which a storage tier other than the uppermost storage tier is assigned, the control unit is configured to change page unit storage area assignment to this area from a storage tier other than the uppermost storage tier to a storage tier below the uppermost storage tier.

3. The storage apparatus according to claim 1, wherein, in a case where the data I/O request is received from the host and where the target area of the virtual volume corresponding to the data I/O request is an area to which a storage area has not yet been assigned, the control unit is configured to assign storage areas in page units from the uppermost storage tier.

4. The storage apparatus according to claim 1, wherein the control unit is configured to take, as a blank area, a capacity obtained by adding capacity of a fixed proportion to the uppermost storage tier capacity designed by the user.

5. The storage apparatus according to claim 1, wherein the control unit is configured to divide the unused capacity of the uppermost storage tier by the speed of processing of the data I/O request with regard to the uppermost storage tier from the host and to calculate the time when the unused capacity of the uppermost storage tier is depleted.

6. The storage apparatus according to claim 1, wherein the capacity of the blank area of the uppermost storage tier is divided by the speed of processing of the data I/O request to the storage tier below the uppermost storage tier from the host and the time for securing the blank area is calculated.

7. The storage apparatus according to claim 1, wherein the speed of processing of the data I/O request from the host is calculated from an average value of actual values spanning the previous minute.

8. A data management method of a storage apparatus which comprises storage devices of a plurality of types of varying performance; and a control unit which manages each of storage areas provided by the storage devices of the plurality of types by means of storage tiers of a plurality of different types, and assigns the storage areas in page units to a virtual volume from any of the storage tiers among the storage tiers of the plurality of types, the data management method comprising:

a first step in which, if a data I/O request is received from the host, the control unit assigns storage areas in page units from the uppermost storage tier to the target areas of the virtual volume corresponding to the data I/O request;

a second step in which the control unit changes the page unit storage area assignment to predetermined areas of the virtual volume from an upper storage tier to a lower storage tier in accordance with the speed of processing of the data I/O request from the host;

a third step in which the control unit takes a blank area of a predetermined capacity of the uppermost storage tier according to a user designation and calculates a time when unused capacity of the uppermost storage tier is depleted and time for securing the blank area on the basis of the speed of processing of the data I/O request from the host; and a fourth step in which, based on the time when the unused capacity is depleted and the time for securing the blank area, the control unit changes page unit storage area assignment to predetermined areas of the virtual volume from the uppermost storage tier to a storage tier below the uppermost storage tier.

9. The data management method according to claim 8, wherein, in the first step, if a target area of the virtual volume corresponding to the data I/O request is an area to which a storage tier other than the uppermost storage tier is assigned, the control unit changes page unit storage area assignment to the area from a storage tier other than the uppermost storage tier to a storage tier below the uppermost storage tier.

10. The data management method according to claim 8, wherein, in the first step, in a case where the data I/O request is received from the host and where the target area of the virtual volume corresponding to the data I/O request is an area to which a storage area has not yet been assigned, the control unit assigns storage areas in page units from the uppermost storage tier.

* * * * *